US009369718B2

(12) United States Patent
Lim et al.

(10) Patent No.: US 9,369,718 B2
(45) Date of Patent: Jun. 14, 2016

(54) DECODING METHOD, DECODING APPARATUS, CODING METHOD, AND CODING APPARATUS USING A QUANTIZATION MATRIX

(75) Inventors: Chong Soon Lim, Singapore (SG); Min Li, Singapore (SG); Hai Wei Sun, Singapore (SG); Youji Shibahara, Osaka (JP); Takahiro Nishi, Nara (JP)

(73) Assignee: SUN PATENT TRUST, New York, NY (US)

( * ) Notice: Subject to any disclaimer, the term of this patent is extended or adjusted under 35 U.S.C. 154(b) by 1026 days.

(21) Appl. No.: 13/503,782

(22) PCT Filed: Oct. 29, 2010

(86) PCT No.: PCT/JP2010/006383
§ 371 (c)(1),
(2), (4) Date: Apr. 24, 2012

(87) PCT Pub. No.: WO2011/052215
PCT Pub. Date: May 5, 2011

(65) Prior Publication Data
US 2012/0251015 A1 Oct. 4, 2012

(30) Foreign Application Priority Data

Oct. 30, 2009 (JP) ................. 2009-251516

(51) Int. Cl.
*H04N 19/126* (2014.01)
*H04N 19/172* (2014.01)
(Continued)

(52) U.S. Cl.
CPC ........... *H04N 19/126* (2014.11); *H04N 19/172* (2014.11); *H04N 19/196* (2014.11); *H04N 19/46* (2014.11); *H04N 19/61* (2014.11); *H04N 19/30* (2014.11)

(58) Field of Classification Search
None
See application file for complete search history.

(56) References Cited

U.S. PATENT DOCUMENTS 7,630,435 B2    12/2009   Chen et al.
7,912,122 B2     3/2011   Kadono et al.
(Continued)

FOREIGN PATENT DOCUMENTS

JP        6-284412          10/1994
JP     2003189308 A    *    7/2003
(Continued)

OTHER PUBLICATIONS
Extended European Search Report issued Feb. 4, 2014 in corresponding European patent application No. 10826351.8.
(Continued)

*Primary Examiner* — Bernard Krasnic
(74) *Attorney, Agent, or Firm* — Wenderoth, Lind & Ponack, L.L.P.

(57) ABSTRACT

A decoding method includes: obtaining a plurality of quantization parameter sets from a header of a coded stream; parsing an identifier from a header of a coded picture included in the coded stream; selecting at least one quantization parameter set from among the plurality of quantization parameter sets, based on the parsed identifier; determining whether a flag parsed from the header of the coded picture has a predetermined value; generating a new quantization matrix from another quantization matrix when the flag has the predetermined value; decoding the coded picture by inversely quantizing the coded picture using the generated new quantization matrix; and decoding the coded picture by inversely quantizing the coded picture using a quantization matrix included in the selected quantization parameter set when the flag does not have the predetermined value.

20 Claims, 26 Drawing Sheets

(51) Int. Cl.
*H04N 19/46* (2014.01)
*H04N 19/196* (2014.01)
*H04N 19/61* (2014.01)
*H04N 19/30* (2014.01)

(56) References Cited

U.S. PATENT DOCUMENTS

| | | | |
|---|---|---|---|
| 7,933,327 | B2 | 4/2011 | Lu et al. |
| 7,995,650 | B2 | 8/2011 | Kadono et al. |
| 2007/0189626 | A1 | 8/2007 | Tanizawa et al. |
| 2007/0219808 | A1* | 9/2007 | Herre et al. ............... 704/500 |
| 2007/0292039 | A1 | 12/2007 | Kadono et al. |
| 2008/0007438 | A1* | 1/2008 | Segall et al. ............... 341/61 |
| 2008/0089410 | A1 | 4/2008 | Lu et al. |
| 2008/0192838 | A1 | 8/2008 | Chen et al. |
| 2008/0253449 | A1 | 10/2008 | Shimizu et al. |
| 2009/0034612 | A1* | 2/2009 | Zheng ............... H04N 19/176 375/240.03 |
| 2010/0054330 | A1 | 3/2010 | Chen et al. |
| 2010/0086028 | A1 | 4/2010 | Tanizawa et al. |
| 2011/0110423 | A1 | 5/2011 | Kadono et al. |
| 2011/0150082 | A1 | 6/2011 | Lu et al. |
| 2011/0150083 | A1 | 6/2011 | Lu et al. |

FOREIGN PATENT DOCUMENTS

| | | |
|---|---|---|
| JP | 2007-520165 | 7/2007 |
| JP | 2007-520948 | 7/2007 |
| JP | 2007-535191 | 11/2007 |
| JP | 2010-213063 | 9/2010 |
| WO | 2005/072312 | 8/2005 |
| WO | 2005/076613 | 8/2005 |
| WO | 2005/076614 | 8/2005 |
| WO | 2007/094100 | 8/2007 |
| WO | 2008/132890 | 11/2008 |

OTHER PUBLICATIONS

Jiuhuai Lu, "Proposal of quantization weighting for H.264/MPEG-4 AVC Professional Profiles", Joint Video Team (JVT) of ISO/IEC MPEG & ITU-T VCEG, 11th Meeting, Munich, DE, Mar. 15-19, 2004.

International Search Report issued Feb. 1, 2011 in International (PCT) Application No. PCT/JP2010/006383.

ISO/IEC 14496-10 "MPEG-4 Advanced Video Coding", Oct. 1, 2004.

* cited by examiner

DECODING METHOD, DECODING APPARATUS, CODING METHOD, AND CODING APPARATUS USING A QUANTIZATION MATRIX

CROSS REFERENCE TO RELATED APPLICATIONS

This application is the national stage of International Application PCT/JP2010/006383, filed Oct. 29, 2010, and claims priority to Japanese Patent Application No. 2009-251516, filed Oct. 30, 2009.

TECHNICAL FIELD

The present invention relates to a decoding method and a decoding apparatus for decoding a coded picture included in a coded stream, and a coding method and a coding apparatus for coding a picture to generate a coded stream.

BACKGROUND ART

In any image or video coding schemes, quantization is an important step to compress data by eliminating a part of information in an image or video. Quantization is usually executed in a transform domain so that information loss in quantization processing enables an image or data to be more appropriately compressed.

In most of the image or video coding schemes, quantization processing can be controlled using quantization parameters. At this time, the greater a value of a quantization parameter is, the greater the amount of compression is, which results in a greater information loss, and vice versa.

In some of the image or video coding schemes, quantization processing and inverse quantization processing can also be controlled using quantization scaling matrixes, rather than quantization parameters. Here, each frequency coefficient in a two-dimensionally transformed block can be quantized using both a quantization parameter and one corresponding quantization scaling matrix. For example, Patent Literature (PTL) 1 describes a video coding apparatus which codes video using quantization scaling matrixes.

Quantization processing and inverse quantization processing can also be controlled using quantization offset matrixes. It should be noted that the term "quantization matrix" is used in the following when a quantization scaling matrix and a quantization offset matrix do not need to be distinguished in particular.

An example of inverse quantization processing can be represented by the following expression.

$$\text{AbsCoeff}[i][j] = ((\text{abs}(\text{QuantizedCoeff}[i][j]) << 7) - \text{Offset}[i][j]) * \text{LevelScale} * \text{QMatrix}[i][j] >> \text{QShift}$$

Here, LevelScale and QShift are controlled using a quantization parameter, QMatrix[i][j] is a quantization scaling matrix, and Offset[i][j] is a quantization offset matrix.

A quantization parameter, a quantization scaling matrix, and a quantization offset matrix are coded in compressed data, and used in an inverse quantization step included in decoding processing for reconstructing an image or video.

In a video encoding scheme such as ISO/IEC 14496-10 (MPEG-4 AVC), a quantization scaling matrix can be coded in the header of a sequence or a picture. When a quantization scaling matrix is coded in the header of a sequence, inverse quantization processing will be performed on all pictures in the same sequence using this quantization scaling matrix, unless other quantization scaling matrixes are coded for the pictures. When a quantization scaling matrix is coded in the header of a picture, inverse quantization processing will be performed on the picture using the quantization scaling matrix coded in the picture header.

It should be noted that in the ISO/IEC 14496-10 (MPEG-4 AVC) coding scheme, for luminance samples, a quantization scaling matrix coded in a sequence header is used for inverse quantization processing when a quantization scaling matrix is not coded in a picture header. However, for chrominance samples, a quantization scaling matrix for luminance samples is used for inverse quantization processing on a picture when a quantization scaling matrix is not coded in the header of the picture.

CITATION LIST

Patent Literature

[PTL 1] Japanese Unexamined Patent Application Publication No. 2010-213063

SUMMARY OF INVENTION

Technical Problem

A problem in conventional technology is that the amount of coding a quantization scaling matrix increases when a quantization scaling matrix is coded in a picture header. In particular, when there are many quantization scaling matrixes and quantization offset matrixes to be coded in picture headers, the amount of coding the quantization scaling matrixes and the quantization offset matrixes increases, which results in a decrease in the efficiency of coding the entire stream.

In view of this, the present invention has been conceived to solve the above problems, and an object thereof is to provide a decoding method, a decoding apparatus, a coding method, and a coding apparatus for enabling suppression of an increase in the amount of coding a quantization matrix.

Solution to Problem

In order to achieve the above object, a decoding method according to an aspect of the present invention is a decoding method for decoding a coded picture included in a coded stream, the decoding method including: obtaining, from a header of the coded stream, a plurality of quantization parameter sets each including a quantization matrix; parsing an identifier for identifying a quantization parameter set from a header of the coded picture included in the coded stream; selecting at least one quantization parameter set from among the plurality of quantization parameter sets, based on the parsed identifier; parsing a flag from the header of the coded picture, and determining whether the parsed flag has a predetermined value; generating a new quantization matrix from another quantization matrix when the flag has the predetermined value; and decoding the coded picture (i) by inversely quantizing the coded picture using the generated new quantization matrix when the flag has the predetermined value, and (ii) by inversely quantizing the coded picture using a quantization matrix included in the selected quantization parameter set when the flag does not have the predetermined value.

According to this, a quantization parameter set for decoding a coded picture is newly generated from another quantization parameter set. Therefore, it is not necessary to code a new quantization matrix itself in the header of the coded picture. Specifically, when pictures are quantized using a different quantization matrix for each in order to improve image quality, it is possible to suppress an increase in the amount of coding a quantization matrix through entropy coding.

It is preferable that in the obtaining, the plurality of quantization parameter sets are obtained by (i) parsing a value indicating the number of quantization parameter sets from the header of the coded stream, (ii) parsing a quantization parameter set from the header of the coded stream, and (iii) duplicating content of the parsed quantization parameter set into a plurality of quantization parameter sets, the number of which depends on the number of quantization parameter sets indicated by the parsed value.

According to this, the content of a quantization parameter set parsed from the header of a coded stream is duplicated into a plurality of quantization parameter sets. Therefore, it is possible to reduce the number of quantization parameter sets coded in the header of a coded stream, and suppress an increase in the amount of coding a quantization matrix.

It is preferable that the coded stream includes a plurality of the coded pictures coded in accordance with a hierarchical prediction order in a hierarchical prediction structure, and in the obtaining, the plurality of quantization parameter sets are obtained by duplicating the content of the parsed quantization parameter set, based on the hierarchical prediction order. Specifically, in the obtaining, the plurality of quantization parameter sets may be obtained by duplicating the content of the parsed quantization parameter set into a quantization parameter set for decoding a coded picture at a lower level in the hierarchical prediction order than a level of a coded picture to be decoded using the parsed quantization parameter set. Further, in the obtaining, the plurality of quantization parameter sets may be obtained by duplicating the content of the parsed quantization parameter set into a quantization parameter set for decoding a coded picture at the same level in the hierarchical prediction order as a level of a coded picture to be decoded using the parsed quantization parameter set.

According to these, the content of a quantization parameter set can be duplicated into a plurality of quantization parameter sets, based on the hierarchical prediction order. Therefore, it is possible to decode a target picture using a quantization parameter set suitable for the level thereof in the hierarchical prediction order, and to suppress an increase in the amount of coding a quantization matrix, while suppressing deterioration of image quality.

It is preferable that in the obtaining, the plurality of quantization parameter sets are obtained by (i) parsing a value indicating the number of quantization parameter sets from the header of the coded stream, and (ii) parsing, from the header of the coded stream, quantization parameter sets, the number of which depends on the parsed value indicating the number of quantization parameter sets.

According to this, a plurality of quantization parameter sets can be easily obtained from the header of a coded stream.

It is preferable that in the generating, the new quantization matrix is generated by (i) obtaining a quantization matrix previously decoded and included in the coded stream, (ii) parsing an update parameter from the header of the coded picture, and (iii) performing computation based on the obtained quantization matrix and the parsed update parameter.

According to this, a new quantization matrix can be computed based on a previously decoded quantization matrix in a coded stream and an update parameter parsed from the header of a coded picture. Specifically, it is sufficient that an update parameter is coded in the header of a coded picture, and thus it is not necessary to code a new quantization matrix itself in the header of the coded picture. Therefore, when pictures are coded using a different quantization matrix for each in order to improve image quality, it is possible to suppress an increase in the amount of coding a quantization matrix. In particular, when quantization matrixes for pictures approximate due to, for instance, the difference of the pictures being little, it is possible to further suppress an increase in the amount of coding a quantization matrix.

It is preferable that in the generating, the new quantization matrix is generated by (i) obtaining a quantization matrix defined in advance, (ii) parsing an update parameter from the header of the coded picture, and (iii) performing computation based on the obtained quantization matrix defined in advance and the parsed update parameter.

According to this, a new quantization matrix can be computed, based on a quantization matrix defined in advance and an update parameter parsed from the header of a coded picture. Specifically, it is sufficient that an update parameter is coded in the header of a coded picture, and thus it is not necessary to code a new quantization matrix itself in the header of the coded picture. Therefore, when pictures are coded using a different quantization matrix for each in order to improve image quality, it is possible to suppress an increase in the amount of coding a quantization matrix.

A coding method according to an aspect of the present invention is a coding method for coding a picture to generate a coded stream, the coding method including: writing a plurality of quantization parameter sets each including a quantization matrix into a header of the coded stream; selecting at least one quantization parameter set from among the plurality of written quantization parameter sets; writing an identifier for identifying the selected quantization parameter set into a header of a target picture; determining whether a new quantization matrix is to be used when the target picture is quantized; generating a new quantization matrix from another quantization matrix when it is determined that a new quantization matrix is to be used; and coding the target picture (i) by quantizing the target picture using the generated new quantization matrix when it is determined that a new quantization matrix is to be used, and (ii) by quantizing the target picture using a quantization matrix included in the selected quantization parameter set when a new quantization matrix is not to be used.

According to this, a quantization parameter set for coding a target picture is newly generated from another quantization parameter set. Therefore, it is not necessary to code a new quantization matrix itself in the header of a coded picture. Specifically, when pictures are coded using a different quantization matrix for each in order to improve image quality, it is possible to suppress an increase in the amount of coding a quantization matrix through entropy coding.

It is preferable that in the quantization parameter set writing, the plurality of quantization parameter sets are written into the header of the coded stream by (i) writing, into the header of the coded stream, a value indicating the number of duplicates of a quantization parameter set to be made, and (ii) writing, into the header of the coded stream, the quantization parameter set to be used for duplication.

According to this, a value indicating the number of duplicates of a quantization parameter set to be made is written into the header of a coded stream. Therefore, since it is not necessary to write all quantization parameters into the header of a coded stream, it is possible to suppress an increase in the amount of coding a quantization matrix.

It is preferable that the quantization parameter set writing includes: writing a value indicating the number of quantization parameter sets into the header of the coded stream; and writing the plurality of quantization parameter sets into the header of the coded stream, the number of the plurality of quantization parameter sets depending on the written value indicating the number of quantization parameter sets.

According to this, it is possible to easily write a plurality of quantization parameter sets into the header of a coded stream.

It is preferable that the coding method further includes: determining a hierarchical prediction structure for a plurality of pictures to be coded; determining a hierarchical prediction order of the plurality of pictures, based on the determined hierarchical prediction structure; and setting a plurality of identifiers for identifying respective quantization parameter sets, based on the determined hierarchical prediction order, wherein in the identifier writing, among the plurality of set identifiers, an identifier for identifying the selected quantization parameter set is written into the header of the target picture.

According to this, a plurality of quantization parameter set identifiers are set based on the hierarchical prediction order, and thus it is possible to reduce the amount of coding parameter set identifiers.

It is preferable that in the generating, the new quantization matrix is generated by (i) obtaining a quantization matrix coded before being included in the coded stream, (ii) writing an update parameter into the header of the target picture, and (iii) performing computation based on the obtained quantization matrix and the written update parameter.

According to this, a new quantization matrix can be computed based on a previously coded quantization matrix in the coded stream and an update parameter parsed from the header of a coded picture. Specifically, it is sufficient that an update parameter is coded in the header of a coded picture, and thus it is not necessary to code the new quantization matrix itself in the header of the coded picture. Therefore, when pictures are coded using a different quantization matrix for each in order to improve image quality, it is possible to suppress an increase in the amount of coding a quantization matrix. In particular, when quantization matrixes for pictures approximate due to, for instance, the difference of the pictures being little, it is possible to further suppress an increase in the amount of coding a quantization matrix.

It is preferable that in the generating, the new quantization matrix is generated by (i) obtaining a quantization matrix defined in advance, (ii) writing an update parameter into the header of the target picture, and (iii) performing computation based on the obtained quantization matrix and the written update parameter.

According to this, a new quantization matrix can be computed based on a quantization matrix defined in advance and an update parameter parsed from the header of a coded picture. Specifically, it is sufficient that an update parameter is coded in the header of a coded picture, and thus it is not necessary to code the new quantization matrix itself in the header of the coded picture. Therefore, when pictures are coded using a different quantization matrix for each in order to improve image quality, it is possible to suppress an increase in the amount of coding a quantization matrix.

A decoding apparatus according to an aspect of the present invention is a decoding apparatus which decodes a coded picture included in a coded stream, the decoding apparatus including: an obtaining unit configured to obtain, from a header of the coded stream, a plurality of quantization parameter sets each including a quantization matrix; an identifier parsing unit configured to parse an identifier for identifying a quantization parameter set from a header of the coded picture included in the coded stream; a selection unit configured to select at least one quantization parameter set from among the plurality of quantization parameter sets, based on the parsed identifier; a parsing unit configured to parse a flag from the header of the coded picture, and determine whether the parsed flag has a predetermined value; a generation unit configured to generate a new quantization matrix from another quantization matrix when the flag has the predetermined value; and a decoding unit configured to decode the coded picture (i) by inversely quantizing the coded picture using the generated new quantization matrix when the flag has the predetermined value, and (ii) by inversely quantizing the coded picture using a quantization matrix included in the selected quantization parameter set when the flag does not have the predetermined value. Further, the decoding apparatus may be configured as an integrated circuit.

With this configuration, the same effects as those of the above decoding method can be achieved.

A coding apparatus according to an aspect of the present invention is a coding apparatus which codes a picture to generate a coded stream, the coding apparatus including: a writing unit configured to write a plurality of quantization parameter sets each including a quantization matrix into a header of the coded stream; a selection unit configured to select at least one quantization parameter set from among the plurality of written quantization parameter sets; an identifier writing unit configured to write an identifier for identifying the selected quantization parameter set into a header of a target picture; a generation unit configured to determine whether a new quantization matrix is to be used when the target picture is quantized, and generate a new quantization matrix from another quantization matrix when determining that a new quantization matrix is to be used; and a coding unit configured to code the target picture (i) by quantizing the target picture using the generated new quantization matrix when it is determined that a new quantization matrix is to be used, and (ii) by quantizing the target picture using a quantization matrix included in the selected quantization parameter set when a new quantization matrix is not to be used. Further, the coding apparatus may be configured as an integrated circuit.

With this configuration, the same effects as those of the above coding method can be achieved.

The present invention can also be realized as a computer program which causes a computer to execute characteristic steps included in such a decoding method or coding method. In addition, it goes without saying that such a computer program can be distributed via a non-transitory computer-readable recording medium such as a compact disk read-only memory (CD-ROM) or via a communication network such as the Internet.

Advantageous Effects of Invention

According to the present invention, it is possible to decrease the number of bits necessary for coding a quantization parameter set, and improve the coding efficiency.

DESCRIPTION OF EMBODIMENTS

The following is a description of embodiments of the present invention with reference to the drawings.

It should be noted that in the following description, a quantization parameter set is a set at least including one or more quantization scaling matrixes or one or more quantization offset matrixes.

Embodiment 1

Figure 1:
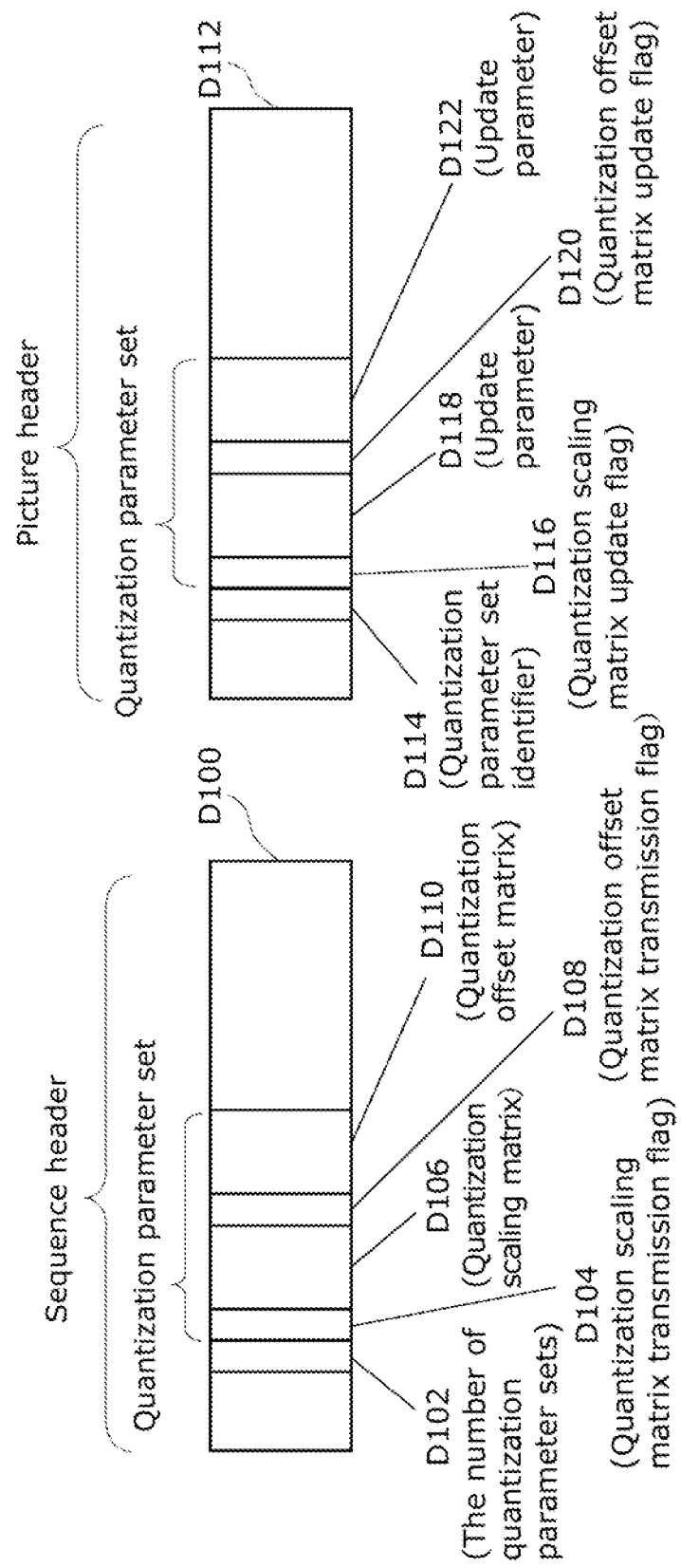
FIG. 1 shows a configuration of a picture header and a sequence header which are included in a coded stream according to Embodiment 1 of the present invention.

FIG. 1 shows a configuration of a picture header and a sequence header which are included in a coded stream according to Embodiment 1 of the present invention. As shown in FIG. 1, a value indicating the number of quantization parameter sets D102 is coded first in a sequence header D100. A quantization scaling matrix transmission flag D104 and a quantization offset matrix transmission flag D108 are coded next.

Here, when the quantization scaling matrix transmission flag D104 has "1", a value representing a quantization scaling matrix D106 is further coded in the sequence header D100. Further, when the quantization offset matrix transmission flag D108 has "1", a value representing a quantization offset matrix D110 is further coded in the sequence header D100.

As shown in FIG. 1, a value indicating a quantization parameter set identifier D114 is coded first in a picture header D112. A quantization scaling matrix update flag D116 and a quantization offset matrix update flag D120 are coded next.

Here, when the quantization scaling matrix update flag D116 has "1", a value representing an update parameter D118 for updating the quantization scaling matrix is further coded in the picture header D112. When the quantization offset matrix update flag D120 has "1", a value representing an update parameter D122 for updating the quantization offset matrix is further coded in the picture header D112.

It should be noted that an update parameter is a parameter for updating another quantization matrix. Specifically, an update parameter is a parameter indicating an amount of change from another quantization matrix. For example, a new quantization matrix is generated by adding or multiplying a value representing the update parameter to or by a value representing the other quantization matrix.

Next is a description of a decoding apparatus which decodes a coded stream including a sequence header and a picture header as shown in FIG. 1.

Figure 2:
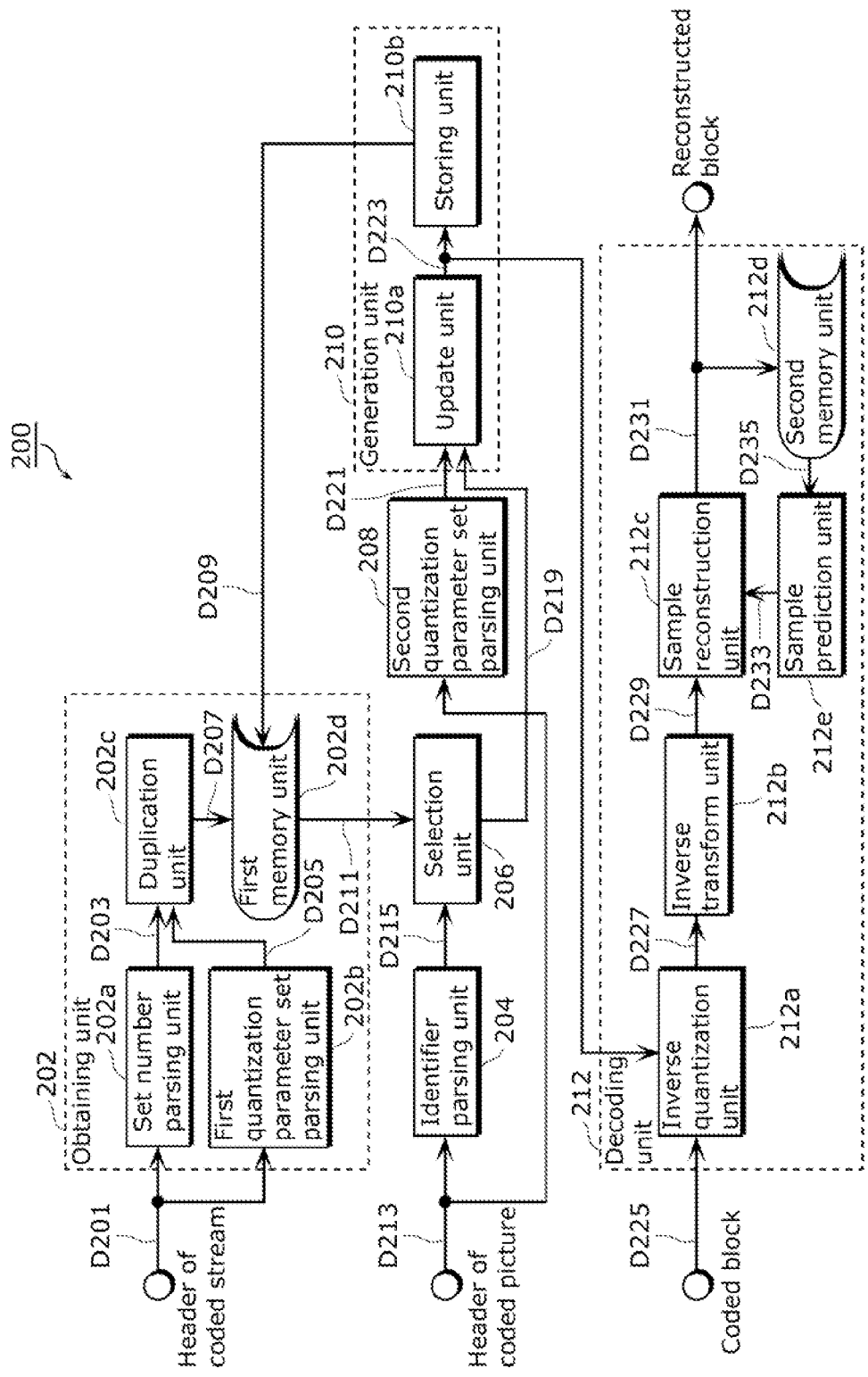
FIG. 2 is a block diagram showing an example of a decoding apparatus according to Embodiment 1 of the present invention.

FIG. 2 is a block diagram showing an example of a decoding apparatus according to Embodiment 1 of the present invention. A decoding apparatus 200 decodes a coded picture included in a coded stream.

As shown in FIG. 2, the decoding apparatus 200 includes an obtaining unit 202, an identifier parsing unit 204, a selection unit 206, a second quantization parameter set parsing unit 208, a generation unit 210, and a decoding unit 212.

The obtaining unit 202 obtains a plurality of quantization parameter sets from the header of a coded stream. The obtaining unit 202 includes a set number parsing unit 202a, a first quantization parameter set parsing unit 202b, a duplication unit 202c, and a first memory unit 202d.

The set number parsing unit 202*a* parses the number of quantization parameter sets D203 from a sequence header D201. Then, the set number parsing unit 202*a* outputs the parsed number of quantization parameter sets D203 to the duplication unit 202*c*.

The first quantization parameter set parsing unit 202*b* parses a quantization parameter set D205 from the sequence header D201. Then, the first quantization parameter set parsing unit 202*b* outputs the parsed quantization parameter set D205 to the duplication unit 202*c*.

The duplication unit 202*c* duplicates the content of a quantization parameter set D207, and stores the content into the first memory unit 202*d*.

The identifier parsing unit 204 parses a quantization parameter set identifier D215 from a header D213 of a coded picture included in the coded stream (hereinafter, simply referred to as "picture header D213"). Then, the identifier parsing unit 204 outputs the parsed quantization parameter set identifier D215 to the selection unit 206. In the embodiments of the present invention, a quantization parameter set identifier is an identifier for identifying one quantization parameter set from among a plurality of quantization parameter sets obtained from the header of a coded stream.

The selection unit 206 selects, using the quantization parameter set identifier D215, a quantization parameter set D211 from among a plurality of quantization parameter sets stored in the first memory unit 202*d*.

The second quantization parameter set parsing unit 208 parses a quantization parameter set from the picture header D213. Then, the second quantization parameter set parsing unit 208 outputs an update parameter D221 to the generation unit 210 according to the result of the parsing. Specifically, the second quantization parameter set parsing unit 208 parses a flag from the picture header D213, and determines whether the parsed flag has a predetermined value. Here, when the flag has the predetermined value, the second quantization parameter set parsing unit 208 outputs the update parameter D221 to the generation unit 210.

The generation unit 210 generates a new quantization matrix from another quantization matrix, when the flag has a predetermined value. Specifically, the generation unit 210 includes an update unit 210*a* and a storing unit 210*b*.

The update unit 210*a* obtains the update parameter D221 and a selected quantization parameter set D219, and outputs a new quantization parameter set D223 to the storing unit 210*b*. Specifically, in the present embodiment, the update unit 210*a* computes a new quantization matrix, based on a previously decoded quantization matrix in the coded stream and the update parameter indicating the amount of change from the decoded quantization matrix.

After that, the storing unit 210*b* stores the new quantization parameter set D209 into the first memory unit 202*d*.

The decoding unit 212 decodes the coded picture by inversely quantizing the coded picture using the generated new quantization matrix, when the flag has the predetermined value. On the other hand, when the flag does not have the predetermined value, the decoding unit 212 decodes the coded picture by inversely quantizing the coded picture using the quantization matrix included in the selected quantization parameter set.

Specifically, the decoding unit 212 includes an inverse quantization unit 212*a*, an inverse transform unit 212*b*, a sample reconstruction unit 212*c*, a second memory unit 212*d*, and a sample prediction unit 212*e*.

The inverse quantization unit 212*a* takes in a coded block D225 included in the coded picture and the new quantization parameter set D223, and executes inverse quantization processing. The inverse transform unit 212*b* inversely transforms an inversely quantized coefficient D227 into a decoded residual D229, and outputs the residual to the sample reconstruction unit 212*c*. The sample reconstruction unit 212*c* takes in the decoded residual D229 and a predicted sample D233, and outputs a reconstructed sample D231. After that, the reconstructed sample D231 is stored into the second memory unit 212*d*, and a reconstructed sample D235 is used by the sample prediction unit 212*e* to generate the predicted sample D233.

Next is a description of a coding apparatus which generates a coded stream including a sequence header and a picture header as shown in FIG. 1.

Figure 3:
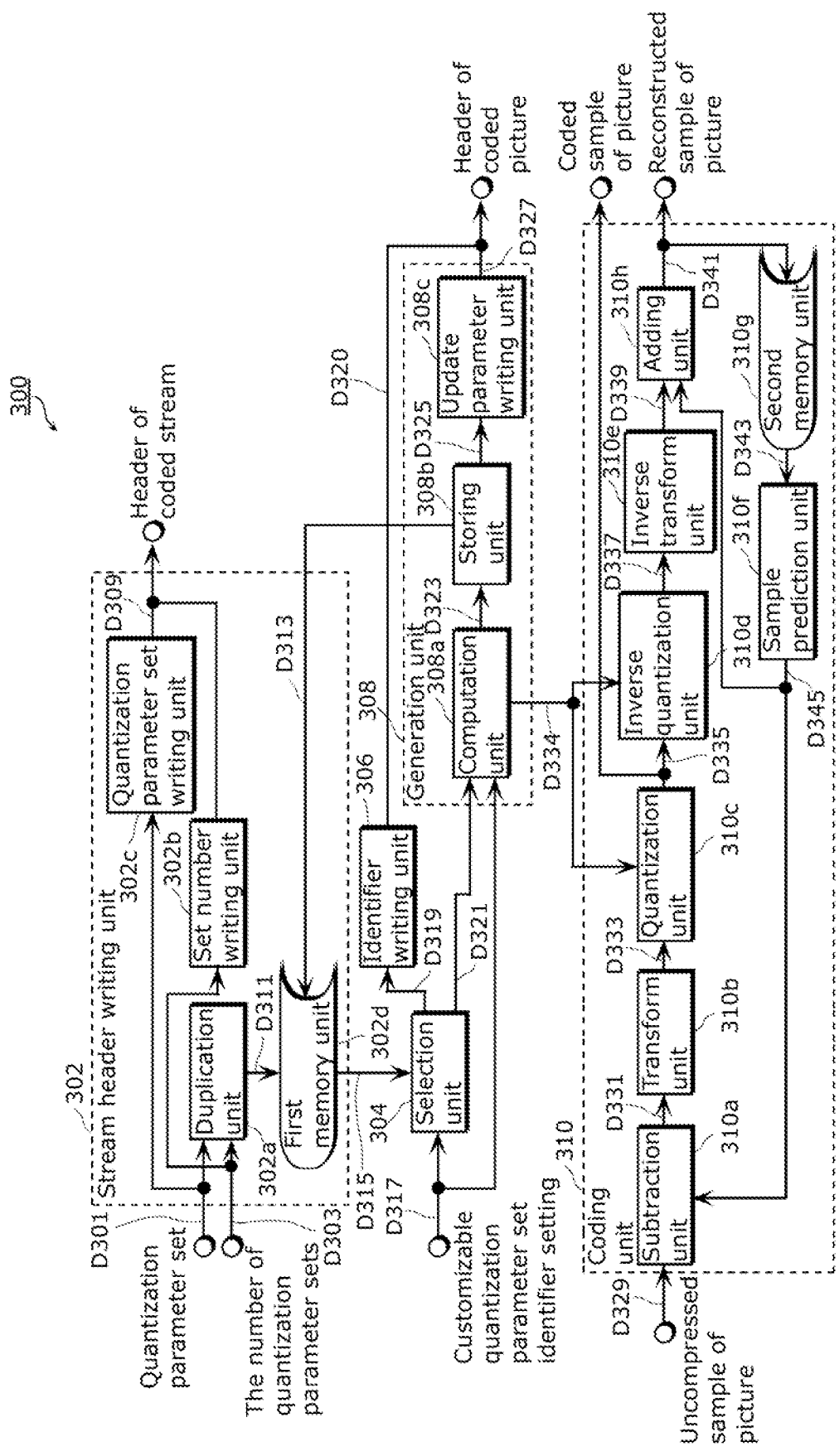
FIG. 3 is a block diagram showing an example of a coding apparatus according to Embodiment 1 of the present invention.

FIG. 3 is a block diagram showing an example of a coding apparatus according to Embodiment 1 of the present invention. A coding apparatus 300 codes a target picture to generate a coded stream.

As shown in FIG. 3, the coding apparatus 300 includes a stream header writing unit 302, a selection unit 304, an identifier writing unit 306, a generation unit 308, and a coding unit 310.

The stream header writing unit 302 writes a plurality of quantization parameter sets into the header of a coded stream. Specifically, the stream header writing unit 302 includes a duplication unit 302*a*, a set number writing unit 302*b*, a quantization parameter set writing unit 302*c*, and a first memory unit 302*d*.

The duplication unit 302*a* obtains a quantization parameter set D301 and the number of quantization parameter sets D303, and stores a quantization parameter set D311 obtained as a result of duplication in the first memory unit 302*d*.

The set number writing unit 302*b* writes the number of quantization parameter sets D307 into the header of the coded sequence.

The quantization parameter set writing unit 302*c* obtains the quantization parameter set D301, and writes the obtained quantization parameter set D309 into the header of the coded stream.

The selection unit 304 obtains customizable quantization parameter setting D317. Furthermore, the selection unit 304 selects a quantization parameter set D315 from among a plurality of quantization parameter sets stored in the first memory unit 302*d*. Then, the selection unit 304 outputs a quantization parameter set identifier D319 for identifying the selected quantization parameter set to the identifier writing unit 306, based on the obtained quantization parameter setting.

After that, the identifier writing unit 306 writes a quantization parameter set identifier D320 into the header of a coded picture.

The generation unit 308 determines whether to use a new quantization matrix when quantizing a target picture. Here, when it is determined that a new quantization matrix is to be used, the generation unit 308 generates a new quantization matrix from another quantization matrix. Specifically, the generation unit 308 includes a computation unit 308*a*, a storing unit 308*b*, and an update parameter writing unit 308*c*.

The computation unit 308*a* obtains a selected quantization parameter set D321 and customizable quantization parameter setting D317. Furthermore, the computation unit 308*a* computes an update parameter indicating the amount of change from the coded quantization matrix in the coded stream. Then, the computation unit 308*a* computes a new quantization parameter set D323, based on the computed update parameter and a previously coded quantization matrix in the coded stream. The computation unit 308*a* outputs the computed update parameter and the new quantization parameter set D323 to the storing unit 308b.

After that, the storing unit 308b stores a new quantization parameter set D313 into the first memory unit 302d, and outputs an update parameter D325 to the update parameter writing unit 308c.

After that, the update parameter writing unit 308c writes an update parameter D327 into the header of the coded picture.

When it is determined that a new quantization matrix is to be used, the coding unit 310 codes the target picture by quantizing the target picture using the generated new quantization matrix. On the other hand, when a new quantization matrix is not to be used, the coding unit 310 codes the target picture by quantizing the target picture using the quantization matrix included in the selected quantization parameter set.

Specifically, the coding unit 310 includes a subtraction unit 310a, a transform unit 310b, a quantization unit 310c, an inverse quantization unit 310d, an inverse transform unit 310e, a sample prediction unit 310f, a second memory unit 310g, and an adding unit 310h.

The subtraction unit 310a takes in an uncompressed sample D329 of the picture and a predicted sample D345, and outputs a residual block D331 to the transform unit 310b.

After that, the transform unit 310b transforms the residual block D331, and outputs a transformed coefficient D333 to the quantization unit 310c.

The quantization unit 310c obtains the transformed coefficient D333 and a quantization parameter set D334, and outputs a coded sample D335 of the picture.

The inverse quantization unit 310d obtains the coded sample D335, and executes inverse quantization processing using the quantization parameter set D334. Then, the inverse quantization unit 310d outputs an inversely quantized coefficient D337 to the inverse transform unit 310e.

After that, the inverse transform unit 310e inversely transforms the inversely quantized coefficient D337, and outputs a reconstructed to residual block D339.

After that, the adding unit 310h adds the reconstructed residual block D339 and the predicted sample D345, and outputs a reconstructed sample D341 of the picture. After that, the reconstructed sample D341 is stored into the second memory unit 310g.

The sample prediction unit 310f reads a reconstructed sample D343 from the second memory unit 310g, and outputs the predicted sample D345.

Next is a description of the operation of the decoding apparatus 200 and the coding apparatus 300 each having the configuration as described above. In other words, a decoding method and a coding method according to the present embodiment will be described.

Figure 4:
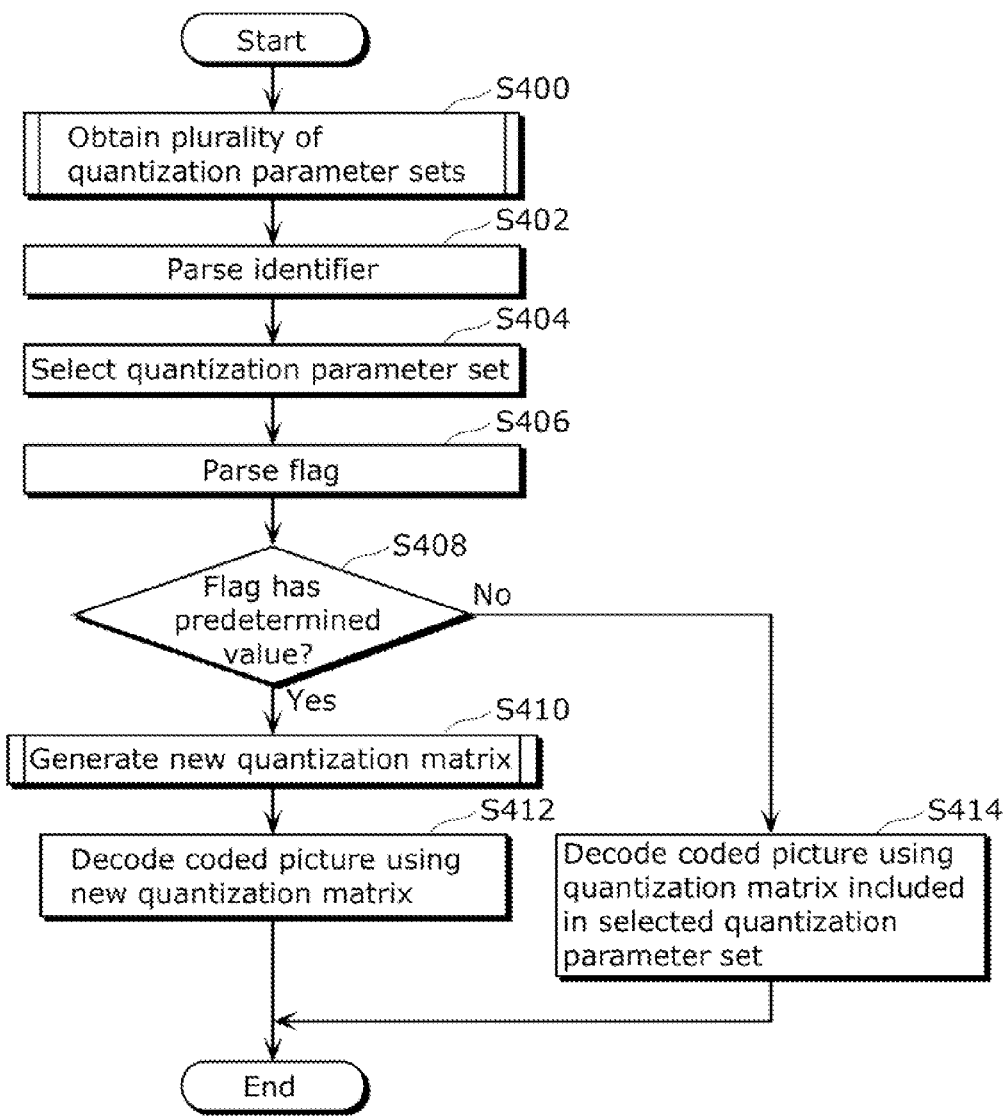
FIG. 4 is a flowchart showing a decoding method according to Embodiment 1 of the present invention.

FIG. 4 is a flowchart showing a decoding method according to Embodiment 1 of the present invention.

First, the obtaining unit 202 obtains a plurality of quantization parameter sets from the header of a coded stream (S400). Specifically, the obtaining unit 202 obtains a plurality of quantization parameter sets from the sequence header D100 shown in FIG. 1, for example.

Subsequently, the identifier parsing unit 204 parses a quantization parameter set identifier from the header of a coded picture included in the coded stream (S402). Specifically, the identifier parsing unit 204 parses the coded quantization parameter set identifier D114 from the picture header D112 shown in FIG. 1, for example.

It should be noted that an identifier may be a parameter for identifying one picture header from among a plurality of picture headers. In this case, a quantization parameter set is associated with the identified picture header.

Next, the selection unit 206 selects at least one quantization parameter set from among a plurality of quantization parameter sets, based on the parsed identifier (S404). Specifically, the selection unit 206 selects one quantization parameter set from among the plurality of quantization parameter sets obtained in step S400, for example.

Then, the second quantization parameter set parsing unit 208 parses a flag from the header of a coded picture (S406), and determines whether the parsed flag has a predetermined value (S408). Specifically, the second quantization parameter set parsing unit 208 parses the coded quantization scaling matrix update flag D116 and the coded quantization offset matrix update flag D120 from the picture header D112 shown in FIG. 1, for example.

Here, when the flag has a predetermined value (for example, "1") (Yes in S408), the generation unit 210 generates a new quantization matrix from another quantization matrix (S410). Specifically, the generation unit 210 generates a new quantization matrix by computation using, for example, a value representing the update parameter D118 shown in FIG. 1 and a value representing a quantization scaling matrix included in the quantization parameter set selected in step S404.

Subsequently, the decoding unit 212 decodes the coded picture by inversely quantizing the coded picture using the generated new quantization matrix (S412).

On the other hand, when the flag does not have the predetermined value (No in S408), the decoding unit 212 decodes the coded picture by inversely quantizing the coded picture using the quantization matrix included in the quantization parameter set selected in step S404 (S414).

It should be noted that when a coded stream includes a plurality of coded pictures, steps S402 to S414 are repeated for each coded picture.

Figure 5:
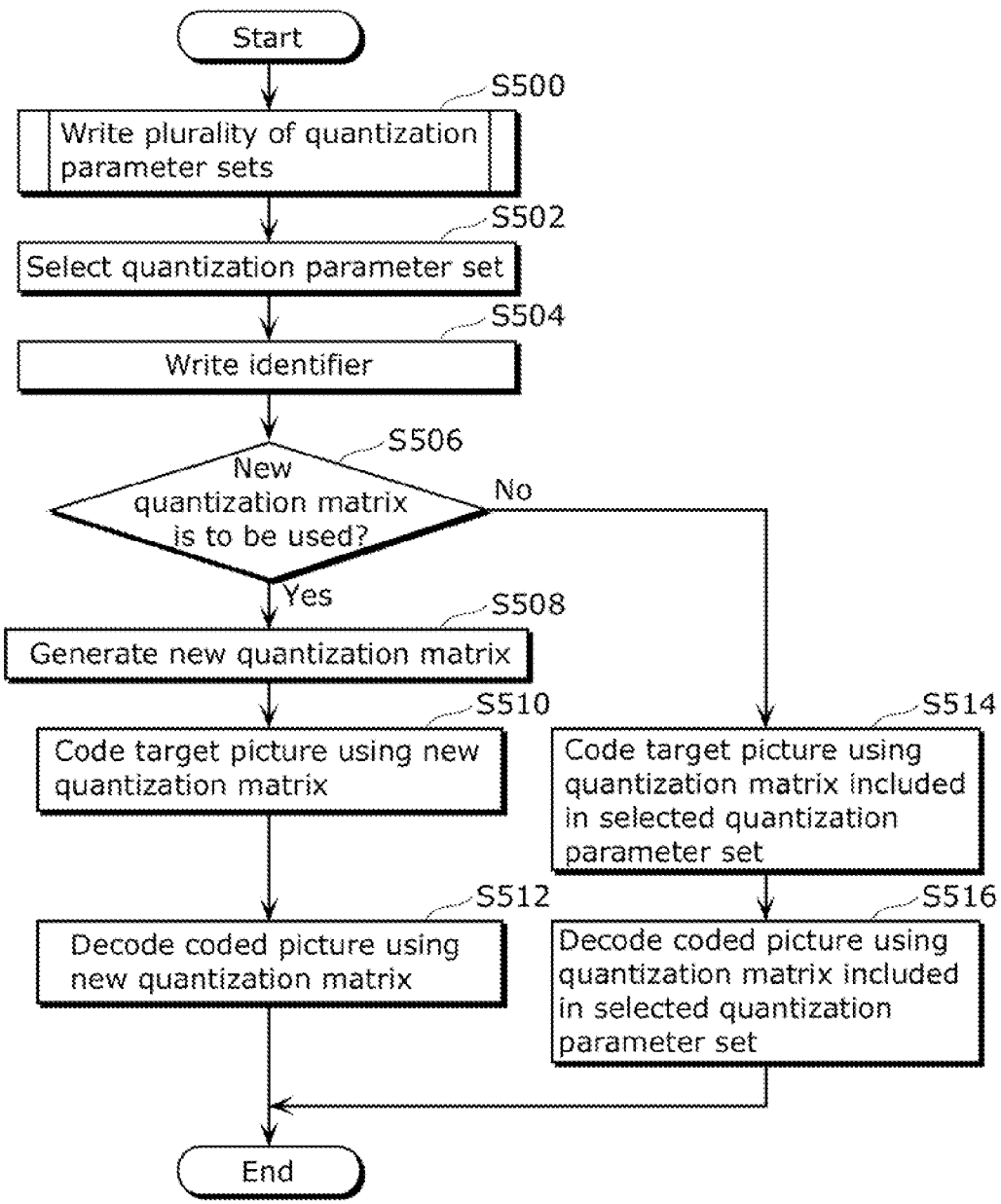
FIG. 5 is a flowchart showing a coding method according to Embodiment 1 of the present invention.

FIG. 5 is a flowchart showing a coding method according to Embodiment 1 of the present invention.

First, the stream header writing unit 302 writes a plurality of quantization parameter sets into the header of a coded stream (S500). Specifically, the stream header writing unit 302 writes the number of quantization parameter sets D102 and quantization parameter sets into the sequence header D100 shown in FIG. 1, for example.

Subsequently, the selection unit 304 selects at least one quantization parameter set from among the written quantization parameter sets (S502). Then, the identifier writing unit 306 writes a quantization parameter set identifier into the header of a target picture (S504). Here, a quantization parameter set identifier is a parameter for identifying a quantization parameter set selected from among a plurality of quantization parameter sets.

It should be noted that an identifier may be a parameter for identifying one picture header from among a plurality of picture headers. In this case, a quantization parameter set is associated with the identified picture header.

Next, the generation unit 308 determines whether a new quantization matrix is to be used when the target picture is quantized (S506). Specifically, the generation unit 308 determines whether a new quantization matrix is to be used, based on a level of the target picture in a hierarchical prediction order, for example.

Here, when it is determined that a new quantization matrix is to be used (Yes in S506), the generation unit 308 generates a new to quantization matrix from another quantization matrix (S508). Subsequently, the coding unit 310 codes the target picture by quantizing the target picture using the generated new quantization matrix (S510). Furthermore, the coding unit 310 decodes the coded picture by inversely quantizing, using the generated new quantization matrix, the picture coded in step S510 (S512).

On the other hand, when it is determined that a new quantization matrix is not to be used (No in S506), the coding unit 310 codes the target picture by quantizing the target picture using the quantization matrix included in the quantization parameter set selected in step S502 (S514). Furthermore, the coding unit 310 decodes the coded picture by inversely quantizing, using the quantization matrix included in the quantization parameter set selected in step S502, the picture coded in step S514 (S516).

It should be noted that when there are a plurality of target pictures to be coded, steps S502 to S516 are repeated for each of the target pictures.

Next is a detailed description of decoding processing shown in FIG. 4 and coding processing shown in FIG. 5, using FIGS. 6 to 11.

Figure 6:
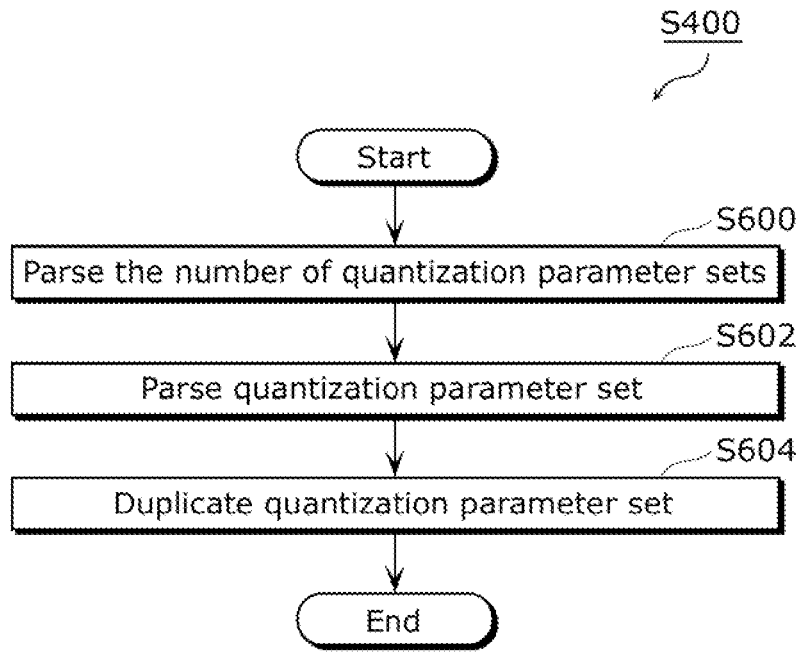
FIG. 6 is a flowchart showing a flow of processing for obtaining a plurality of quantization parameter sets from a header of a coded stream in the decoding method according to Embodiment 1 of the present invention.

FIG. 6 is a flowchart showing a flow of processing for obtaining a plurality of quantization parameter sets from the header of a coded stream in the decoding method according to Embodiment 1 of the present invention. Specifically, FIG. 6 shows the details of processing of step S400 in FIG. 4.

First, the set number parsing unit 202a parses a value indicating the number of quantization parameter sets from the header of a coded stream (S600). Specifically, the set number parsing unit 202a parses a value indicating the number of coded quantization parameter sets D102 from the sequence header D100 shown in FIG. 1, for example.

Next, the first quantization parameter set parsing unit 202b parses one quantization parameter set from the header of the coded stream (S602). Specifically, the first quantization parameter set parsing unit 202b parses one coded quantization parameter set from the sequence header D100 shown in FIG. 1, for example.

At last, the duplication unit 202c duplicates the content of the parsed quantization parameter set into a plurality of quantization parameter sets, the number of which depends on the number of quantization parameter sets indicated by the parsed value (S604). Specifically, the duplication unit 202c duplicates, into the first memory unit 202d, the content of the quantization parameter set parsed for the number of quantization parameter sets indicated by the parsed value.

Figure 9:
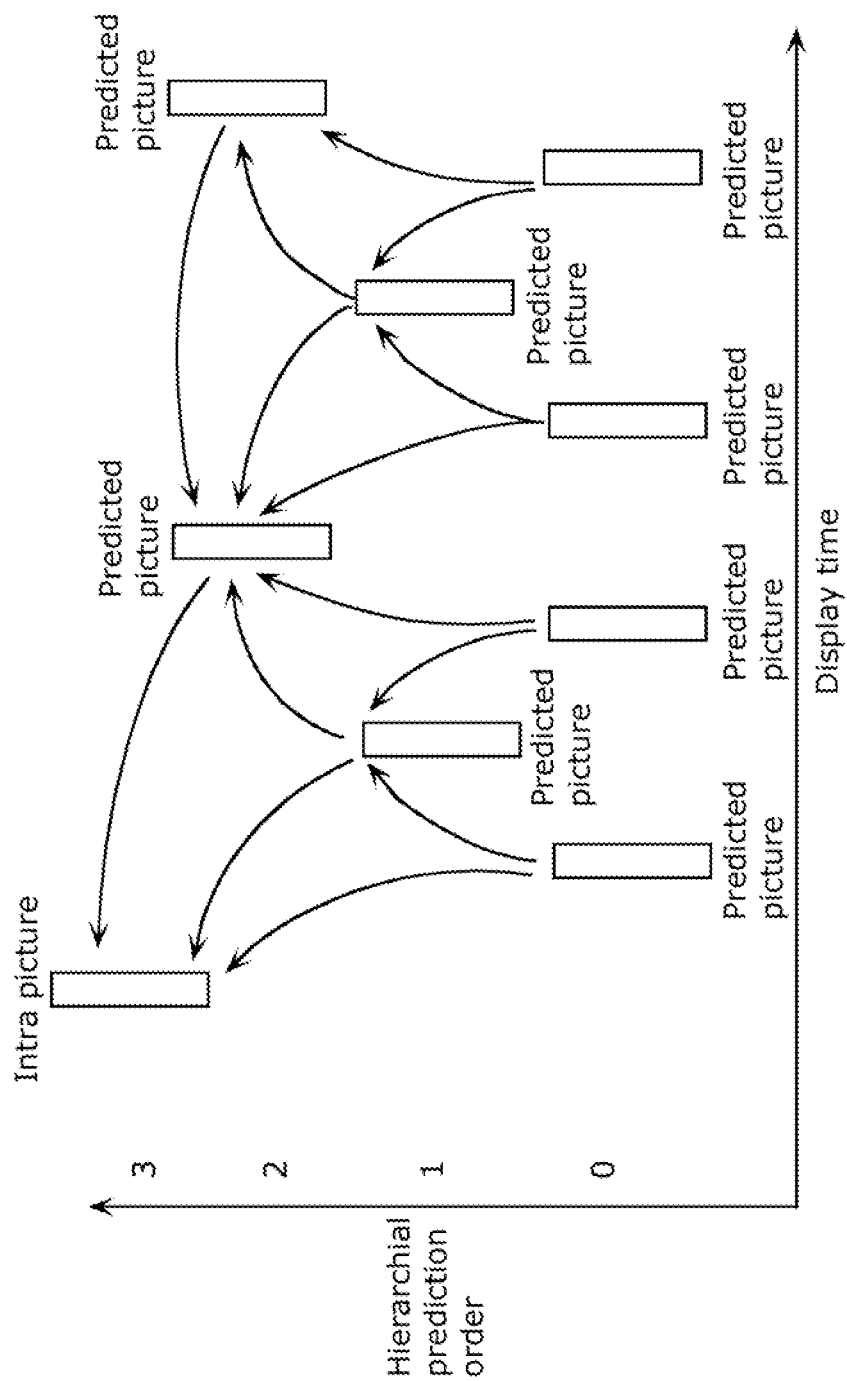
FIG. 9 is a diagram illustrating a hierarchical prediction order of pictures.

For example, it is assumed that the coded stream includes a plurality of coded pictures coded in accordance with the hierarchical prediction order based on a hierarchical prediction structure as shown in FIG. 9 described below. In such a case, the duplication unit 202c duplicates the content of the parsed quantization parameter set, based on the hierarchical prediction order.

Specifically, the duplication unit 202c duplicates the content of the parsed quantization parameter set into a plurality of quantization parameter sets for decoding coded pictures at lower hierarchical levels than the level of the coded picture to be decoded using the parsed quantization parameter set, for example. Specifically, the duplication unit 202c duplicates the content of the quantization parameter set for decoding a coded picture at a higher hierarchical level into quantization parameter sets for decoding coded pictures at lower hierarchical levels.

Further, for example, the duplication unit 202c may duplicate the content of the parsed quantization parameter set into a plurality of quantization parameter sets for decoding coded pictures at the same hierarchical level as the level of the coded picture to be decoded using the parsed quantization parameter set. Specifically, the duplication unit 202c may duplicate the content of a quantization parameter set for decoding a coded picture at a certain hierarchical level, into a quantization parameter set for decoding a coded picture at the same hierarchical level as the certain hierarchical level.

In this way, the content of a quantization parameter set can also be duplicated into a plurality of quantization parameter sets, based on the hierarchical prediction order. Specifically, a target picture can be decoded using a quantization parameter set suitable for the level thereof in the hierarchical prediction order, and thus it is possible to suppress an increase in the amount of coding a quantization matrix, while suppressing deterioration of image quality.

Figure 7:
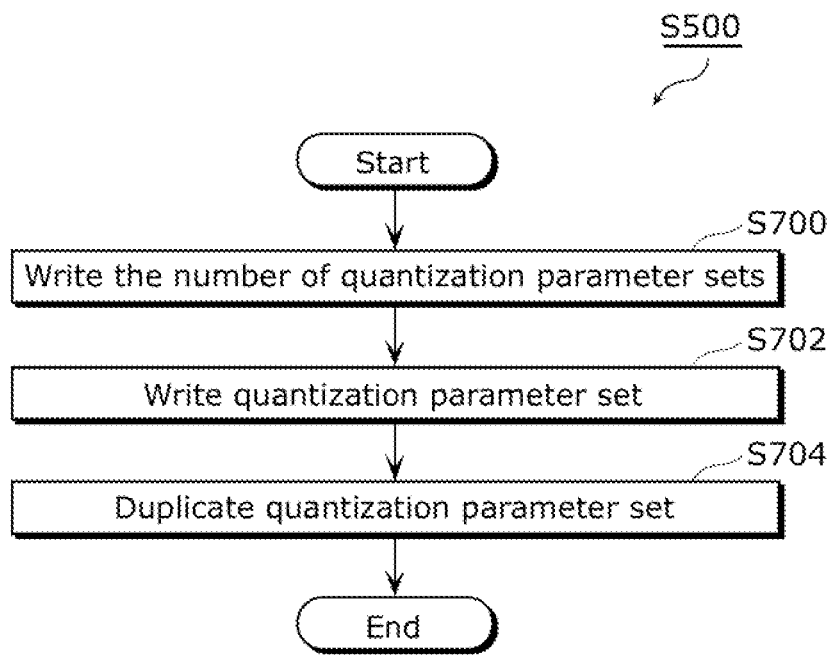
FIG. 7 is a flowchart showing a flow of processing for writing quantization parameter sets into a header of a coded stream in the coding method according to Embodiment 1 of the present invention.

FIG. 7 is a flowchart showing a flow of processing for writing a quantization parameter set into the header of a coded stream in the coding method according to Embodiment 1 of the present invention. Specifically, FIG. 7 shows the details of processing of step S500 in FIG. 5.

First, the set number writing unit 302b writes a value indicating the number of duplicates of a quantization parameter set to be made, into the header of a coded stream (S700). Specifically, the set number writing unit 302b writes a value indicating the number of quantization parameter sets D102 into the sequence header D100 shown in FIG. 1, for example.

Next, the quantization parameter set writing unit 302c writes, into the header of the coded stream, a quantization parameter set to be used for duplication (S702). Specifically, the quantization parameter set writing unit 302c writes one quantization parameter set in the sequence header D100 shown in FIG. 1, for example.

At last, the duplication unit 302a duplicates the content of one parsed quantization parameter set for the parsed number of quantization parameter sets (S704). Specifically, the duplication unit 202c duplicates, into the first memory unit 302d, the content of the parsed quantization parameter set for the number depending on the parsed value.

In this way, the content of a parsed quantization parameter set from the header of a coded stream is duplicated into a plurality of quantization parameter sets. Therefore, the number of quantization parameter sets coded in the header of a coded stream can be reduced, and an increase of the amount of coding a quantization matrix can be suppressed.

Figure 8:
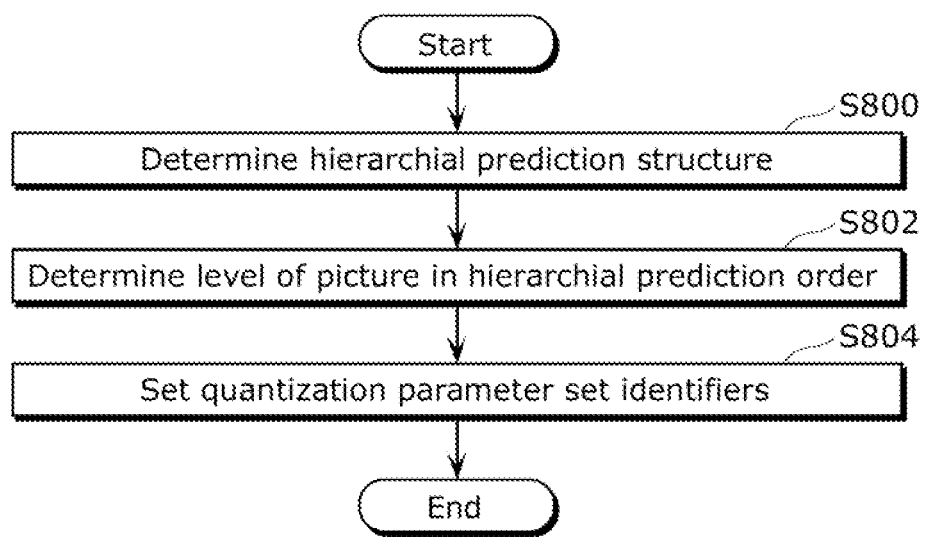
FIG. 8 is a flowchart showing a flow of processing for setting values of quantization parameter set identifiers in the coding method according to Embodiment 1 of the present invention.

FIG. 8 is a flowchart showing a flow of processing for setting a value of a quantization parameter set identifier in the coding method according to Embodiment 1 of the present invention.

As shown in FIG. 8, a hierarchical prediction structure for a plurality of pictures to be coded is determined first (S800). Then, a level of each picture in the hierarchical prediction order is determined based on the determined hierarchical prediction structure (S802). At last, a plurality of quantization parameter set identifiers for identifying respective quantization parameter sets are set based on the determined hierarchical prediction order (S804). Then, an identifier for identifying a quantization parameter set selected from among the plurality of quantization parameter set identifiers thus set is written into the header of a coded picture by the identifier writing unit 306.

Specifically, in the present embodiment, the stream header writing unit 302 writes a plurality of quantization parameter sets each corresponding to a level in the hierarchical prediction order into the header of a coded stream. Then, the selection unit 304 selects a quantization parameter set corresponding to the level of a target picture in the hierarchical prediction order from among the plurality of quantization parameter sets. The identifier writing unit 306 writes the identifier of the quantization parameter set thus selected into the header of a coded picture.

FIG. 9 is a diagram illustrating the hierarchical prediction order of pictures. As shown in FIG. 9, the hierarchical prediction structure is a structure of pictures that are hierarchically referred to in prediction coding. Further, the hierarchical prediction order indicates hierarchical positions in the hierarchical prediction structure. A picture at a high hierarchical level is a picture to be indirectly and directly referred to by many pictures, and in the example of FIG. 9, a picture at the highest hierarchical level is an intra picture. In FIG. 9, a picture at a higher hierarchical level has a greater value in the hierarchical prediction order. A picture at a higher hierarchical level may have a smaller value. It should be noted that in the present embodiment, a quantization parameter set identifier having a greater value is assigned for a lower hierarchical level in the hierarchical prediction order.

In this way, the coding apparatus 300 can reduce the amount of coding parameter set identifiers by setting a plurality of quantization parameter set identifiers, based on the hierarchical prediction order. Further, it is possible to reduce the amount of coding a picture by quantizing a target picture using a quantization parameter set corresponding to a level thereof in the hierarchical prediction order, while suppressing deterioration of the image quality. For example, it is sufficient that a target picture is quantized using a quantization parameter set with which a quantization step size is smaller as a picture is at a higher level in the hierarchical prediction order. In this case, it is possible to further suppress deterioration of image quality of a picture having a greater influence on other pictures, and to further decrease the amount of coding a picture having a smaller influence on other pictures.

Figure 10:
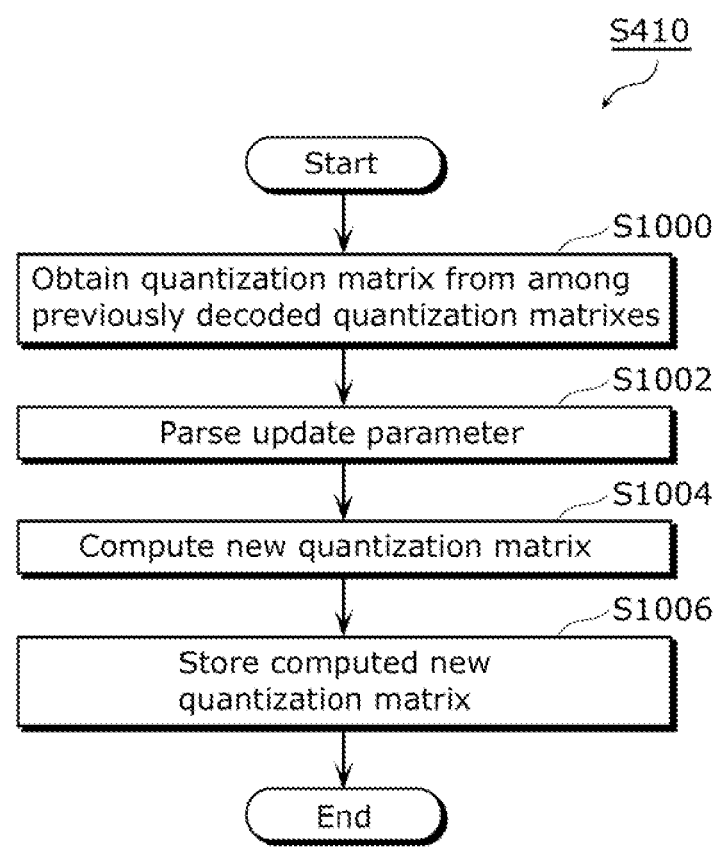
FIG. 10 is a flowchart showing a flow of processing for generating a new quantization matrix in the decoding method according to Embodiment 1 of the present invention.

FIG. 10 is a flowchart showing a flow of processing for generating a new quantization matrix in the decoding method according to Embodiment 1 of the present invention. Specifically, FIG. 10 shows the details of processing of step S410 in FIG. 4.

First, the update unit 210*a* obtains a previously decoded quantization matrix in the coded stream (S1000). The previously decoded quantization matrix is a quantization matrix included in the sequence header D100 shown in FIG. 1, for example. Further, for example, the previously decoded quantization matrix may be a quantization matrix for a last decoded picture. Furthermore, for example, the previously decoded quantization matrix may be a quantization matrix for a reference picture, or for example, may be a quantization matrix for a coded picture at the same or high hierarchical level in the hierarchical prediction structure shown in FIG. 9.

Next, the update unit 210*a* parses an update parameter from the header of a coded picture (S1002). Then, the update unit 210*a* computes a new quantization matrix, based on the obtained quantization matrix and the parsed update parameter (S1004). Specifically, the update unit 210*a* computes a new quantization matrix by adding or multiplying a value representing a quantization matrix to or by a value representing an update parameter, for example.

At last, the storing unit 210*b* stores the computed new quantization matrix into the first memory unit 202*d* (S1006).

Figure 11:
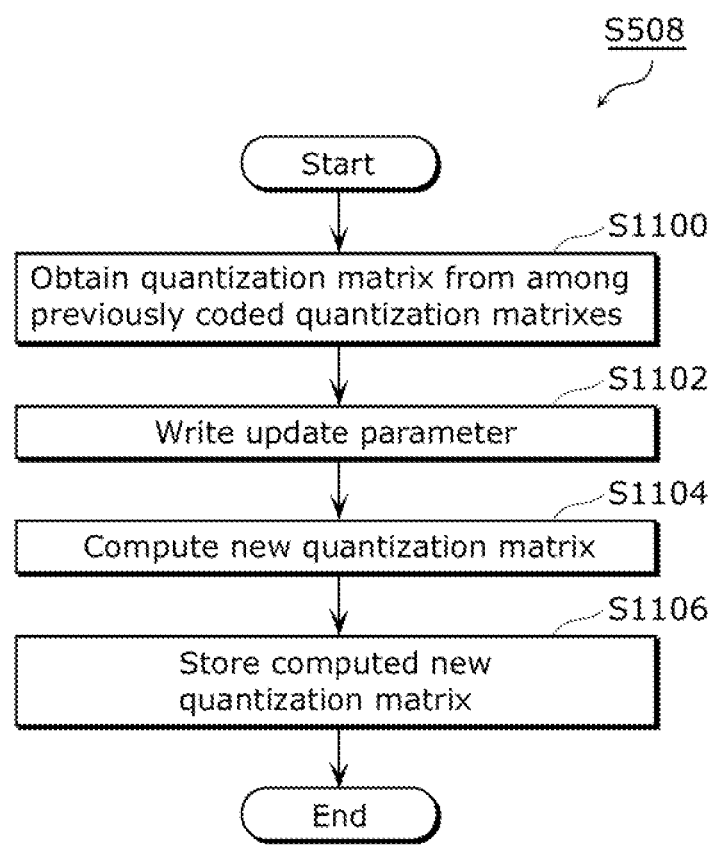
FIG. 11 is a flowchart showing a flow of processing for generating a new quantization matrix in the coding method according to Embodiment 1 of the present invention.

FIG. 11 is a flowchart showing a flow of processing for generating a new quantization matrix in the coding method according to Embodiment 1 of the present invention. Specifically, FIG. 11 shows the details of processing of step S508 in FIG. 5.

First, the computation unit 308*a* obtains a quantization matrix from among previously coded quantization matrixes in the coded stream (S1100). Next, the update parameter writing unit 308*c* writes an update parameter into the header of the coded picture (S1102). This update parameter is determined by, for example, the computation unit 308*a* according to a feature of a target picture.

The computation unit 308*a* computes a new quantization matrix, based on the obtained quantization matrix and the written update parameter (S1104). Then, the storing unit 308*b* stores the computed new quantization matrix into the first memory unit 302*d* (S1106).

In this way, a new quantization matrix can be computed based on the previously decoded quantization matrix in the coded stream and the update parameter parsed from the header of the coded picture. Specifically, since it is sufficient that an update parameter is coded in the header of a coded picture, it is not necessary to code the new quantization matrix itself in the header of the coded picture. Therefore, it is possible to suppress an increase in the amount of coding a quantization matrix when pictures are coded using a different quantization matrix for each in order to improve image quality. In particular, when quantization matrixes for pictures approximate due to, for instance, the difference of the pictures being little, it is possible to further suppress an increase in the amount of coding a quantization matrix.

As described above, according to the decoding apparatus 200 according to the present embodiment, a quantization parameter set for decoding a coded picture is newly generated from another quantization parameter set. Therefore, it is not necessary to code the new quantization matrix itself in the header of the coded picture. Specifically, when pictures are quantized using a different quantization matrix for each in order to improve image quality, it is possible to suppress an increase in the amount of coding a quantization matrix through entropy coding.

According to the coding apparatus 300 according to the present embodiment, a quantization parameter set for coding a target picture is newly generated from another quantization parameter set. Therefore, it is not necessary to code the new quantization matrix itself in the header of a coded picture. Specifically, when pictures are coded using a different quantization matrix for each in order to improve image quality, it is possible to suppress an increase in the amount of coding a quantization matrix through entropy coding.

Embodiment 2

Next is a description of Embodiment 2 of the present invention.

The present embodiment differs from Embodiment 1 mainly in that a plurality of quantization parameter sets are coded in the header of a coded stream, and a new quantization matrix is generated based on a quantization matrix defined in advance.

The following is a description of Embodiment 2, focusing on the differences from Embodiment 1 with reference to the drawings.

Figure 12:
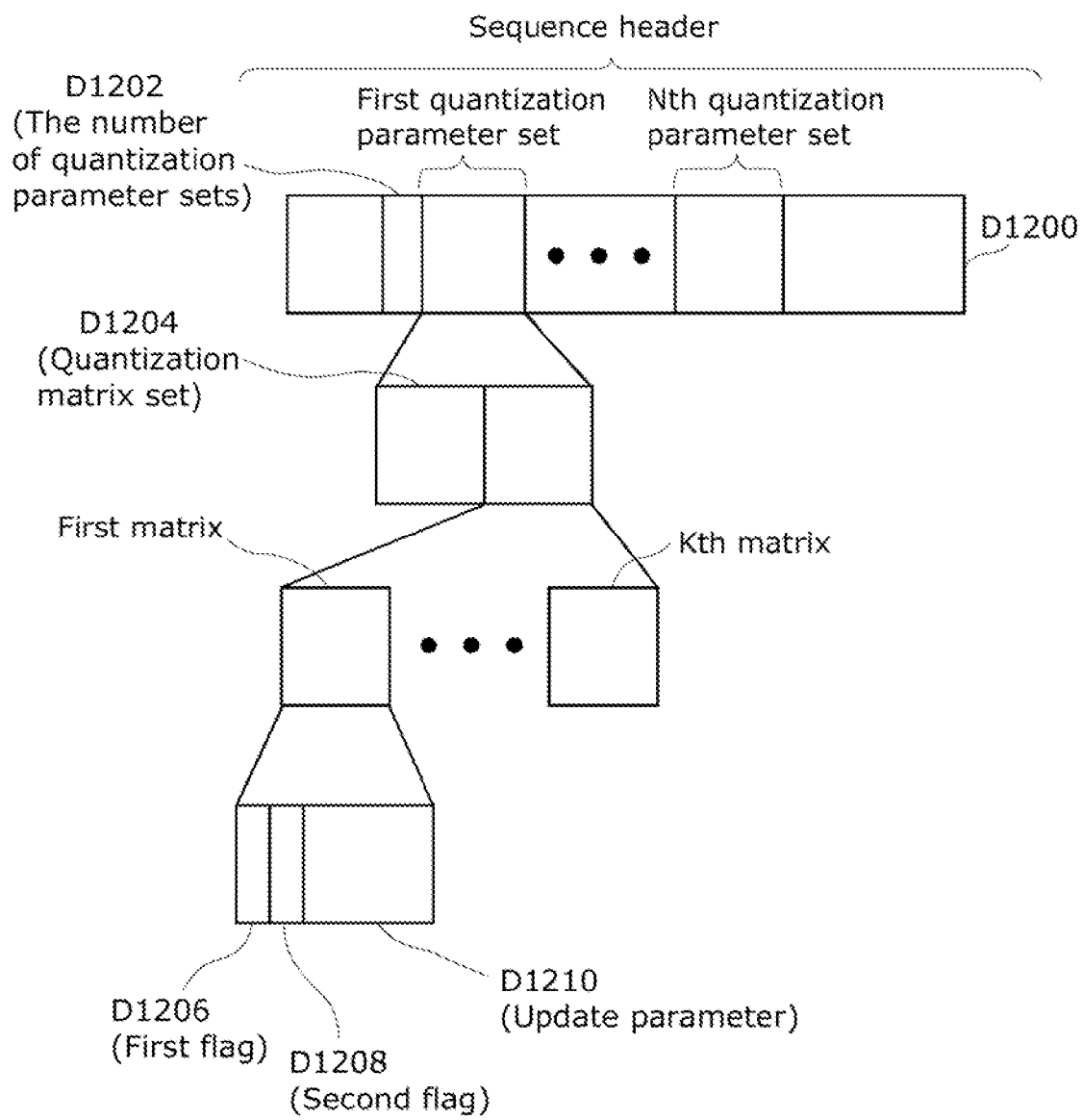
FIG. 12 shows a configuration of a sequence header included in a coded stream according to Embodiment 2 of the present invention.
Figure 13:
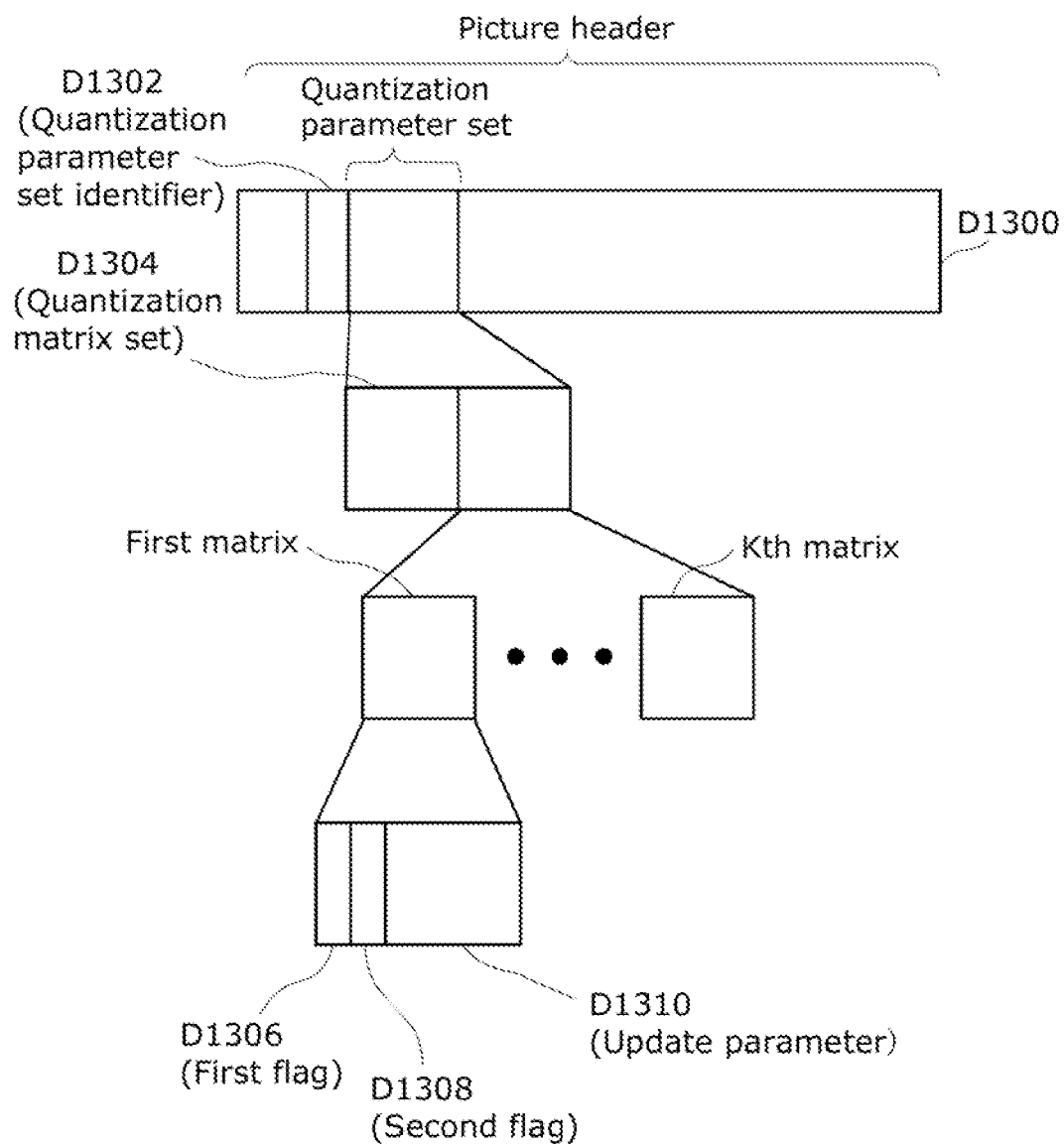
FIG. 13 shows a configuration of a picture header included in the coded stream according to Embodiment 2 of the present invention.

FIG. 12 shows the configuration of a sequence header included in a coded stream according to Embodiment 2 of the present invention. FIG. 13 shows a configuration of a picture header included in a coded stream according to Embodiment 2 of the present invention.

As shown in FIG. 12, in a sequence header D1200, a value indicating the number of quantization parameter sets D1202 is coded first. Values representing first to Nth quantization parameter sets are coded next.

Each quantization parameter set coded in the sequence header D1200 includes a quantization matrix set D1204 including a plurality of quantization scaling matrixes or a plurality of quantization offset matrixes.

Each quantization-matrix set includes a first flag D1206 indicating whether a new quantization matrix is to be transmitted, and a second flag D1208 indicating whether a new quantization matrix is to be computed from a quantization matrix defined in advance or a quantization matrix computed previously. It should be noted that this second flag does not necessarily need to be present. Even in such a case, a new quantization matrix can be computed from a quantization matrix defined in advance or a quantization matrix computed previously.

When the first flag D1206 indicates that a new quantization matrix is to be transmitted, an update parameter D1210 for updating the quantization matrix defined in advance or the quantization matrix computed previously is coded, following the first flag D1206 and the second flag D1208.

Further, as shown in FIG. 13, a quantization parameter set identifier D1302 for identifying one quantization parameter set from among a plurality of quantization parameter sets is coded in a picture header D1300. The selected quantization parameter set is coded next.

The selected quantization parameter set coded in the picture header D1300 includes a quantization matrix set D1304 including a plurality of quantization scaling matrixes or a plurality of quantization offset matrixes.

In each quantization-matrix set, a first flag D1306 that indicates whether a new quantization matrix is to be transmitted, and a second flag D1308 that indicates whether a new quantization matrix is to be computed from a quantization matrix defined in advance or a quantization matrix computed previously are present. It should be noted that this second flag does not necessarily need to be present. Even in such a case, a new quantization matrix can be computed from a quantization matrix defined in advance or a quantization matrix computed previously.

Then, when the first flag D1306 indicates that a new quantization matrix is to be transmitted, an update parameter D1310 for updating the quantization matrix defined in advance or the quantization matrix computed previously is coded, following the first flag D1306 and the second flag D1308.

Next is a description of a decoding apparatus which decodes a coded stream including a sequence header and a picture header as shown in FIGS. 12 and 13.

Figure 14:
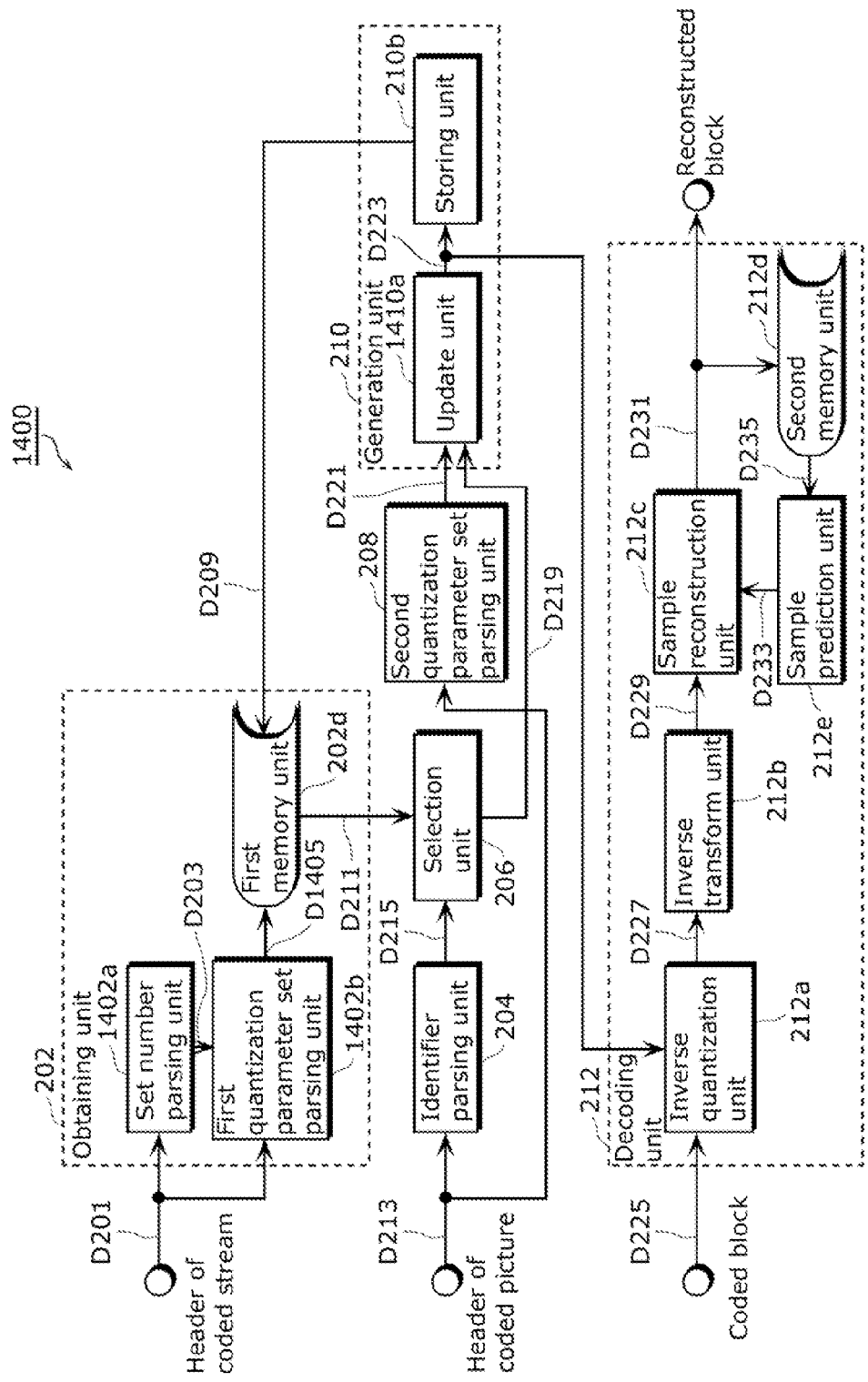
FIG. 14 is a block diagram showing an example of a decoding apparatus according to Embodiment 2 of the present invention.

FIG. 14 is a block diagram showing an example of the decoding apparatus according to Embodiment 2 of the present invention. It should be noted that in FIG. 14, the same numerals are given to the same constituent elements as in FIG. 2, and a description thereof is omitted as appropriate.

A decoding apparatus 1400 includes the obtaining unit 202, the identifier parsing unit 204, the selection unit 206, the second quantization parameter set parsing unit 208, the generation unit 210, and the decoding unit 212.

The obtaining unit 202 obtains a plurality of quantization parameter sets from the header (for example, sequence header) of a coded stream. The obtaining unit 202 includes a set number parsing unit 1402a, a first quantization parameter set parsing unit 1402b, and the first memory unit 202d.

The set number parsing unit 1402a parses the number of quantization parameter sets D203 from the sequence header D201. Then, the set number parsing unit 1402a outputs the parsed number of quantization parameter sets D203 to the first quantization parameter set parsing unit 1402b.

The first quantization parameter set parsing unit 1402b parses a plurality of quantization parameter sets D1405 from the sequence header D201. Then, the first quantization parameter set parsing unit 1402b stores the plurality of parsed quantization parameter sets D1405 into the first memory unit 202d.

An update unit 1410a included in the generation unit 210 obtains an update parameter D221 and a selected quantization parameter set D219, and outputs a new quantization parameter set D223 to the storing unit 210b. In the present embodiment, the update unit 1410a computes a new quantization matrix, based on the quantization matrix defined in advance and an update parameter for updating the quantization matrix.

Next is a description of a coding apparatus which generates a coded stream including a sequence header and a picture header as shown in FIGS. 12 and 13.

Figure 15:
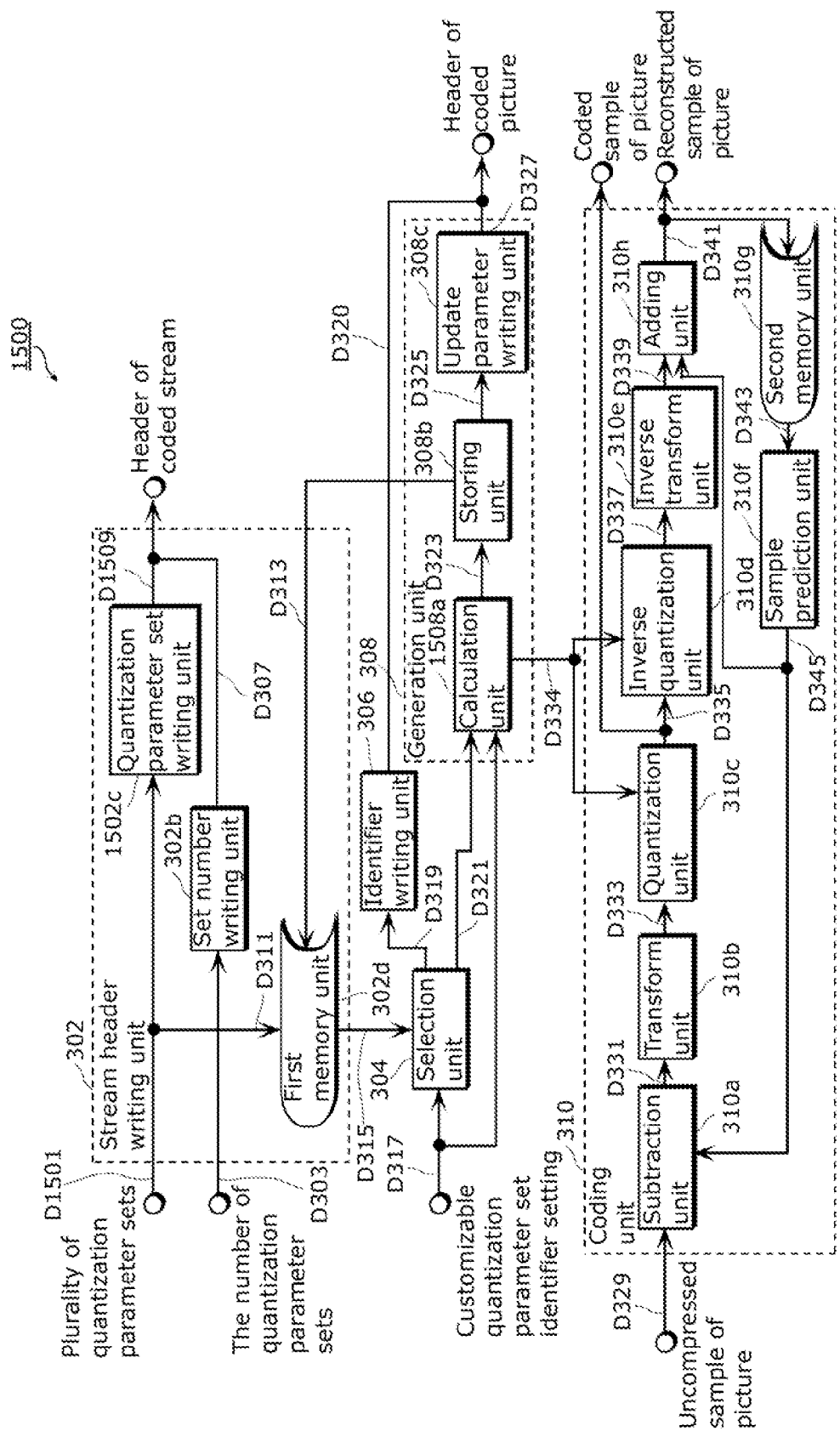
FIG. 15 is a block diagram showing an example of a coding apparatus according to Embodiment 2 of the present invention.

FIG. 15 is a block diagram showing an example of a coding apparatus according to Embodiment 2 of the present invention. It should be noted that in FIG. 15, the same numerals are given to the same constituent elements as in FIG. 3, and a description thereof is omitted as appropriate.

A coding apparatus 1500 includes the stream header writing unit 302, the selection unit 304, the identifier writing unit 306, the generation unit 308, and the coding unit 310.

The stream header writing unit 302 writes a plurality of quantization parameter sets into the header of a coded stream. Specifically, the stream header writing unit 302 includes the set number writing unit 302b, a quantization parameter set writing unit 1502c, and the first memory unit 302d.

The quantization parameter set writing unit 1502c obtains a plurality of quantization parameter sets D1501. The number of the quantization parameter sets D1501 depends on the value written into the header of the coded stream by the set number writing unit 302b and indicating the number of quantization parameter sets. Then, the quantization parameter set writing unit 1502c writes a plurality of obtained quantization parameter sets D1509 into the header of the coded stream.

A computation unit 1508a included in the generation unit 308 obtains a selected quantization parameter set D321 and customizable quantization parameter setting D317. Furthermore, the computation unit 1508a computes an update parameter which indicates the amount of change from the quantization matrix defined in advance. Then, the computation unit 1508a computes a new quantization parameter set D323, based on the computed update parameter and the quantization matrix defined in advance. The computation unit 1508a outputs the computed update parameter and the new quantization parameter set D323 to the storing unit 308b.

Next is a description of the operation of the decoding apparatus 1400 and the coding apparatus 1500 each having the configuration as described above. It should be noted that the difference of the operation from Embodiment 1 is now described.

Figure 16:
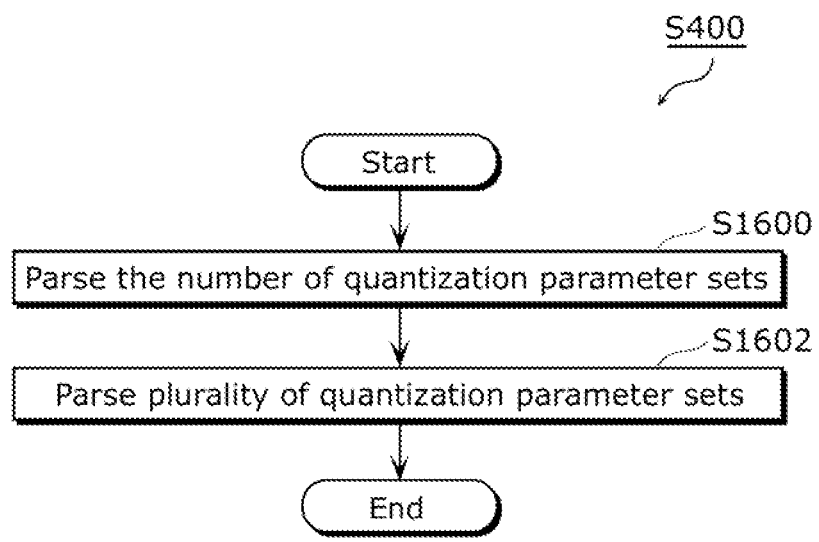
FIG. 16 is a flowchart showing a flow of processing for obtaining a plurality of quantization parameter sets from a header of the coded stream in a decoding method according to Embodiment 2 of the present invention.

FIG. 16 is a flowchart showing a flow of processing for obtaining a plurality of quantization parameter sets from the header of a coded stream in a decoding method according to Embodiment 2 of the present invention. Specifically, FIG. 16 shows the details of processing of step S400 in FIG. 4.

First, the set number parsing unit 1402a parses a value indicating the number of quantization parameter sets from the header of the coded stream (S1600). Specifically, the set number parsing unit 1402a parses a value indicating the number of coded quantization parameter sets D1202 from the sequence header D1200 shown in FIG. 12, for example.

Next, the first quantization parameter set parsing unit 1402b parses a plurality of quantization parameter sets, the number of which depends on the number of quantization parameter sets indicated by the value parsed from the header of the coded stream (S1602). Specifically, for example, the first quantization parameter set parsing unit 202b parses N quantization parameter sets (first to Nth quantization parameter sets) from the sequence header D1200 shown in FIG. 12, N being indicated by the number of quantization parameter sets D1202.

Figure 17:
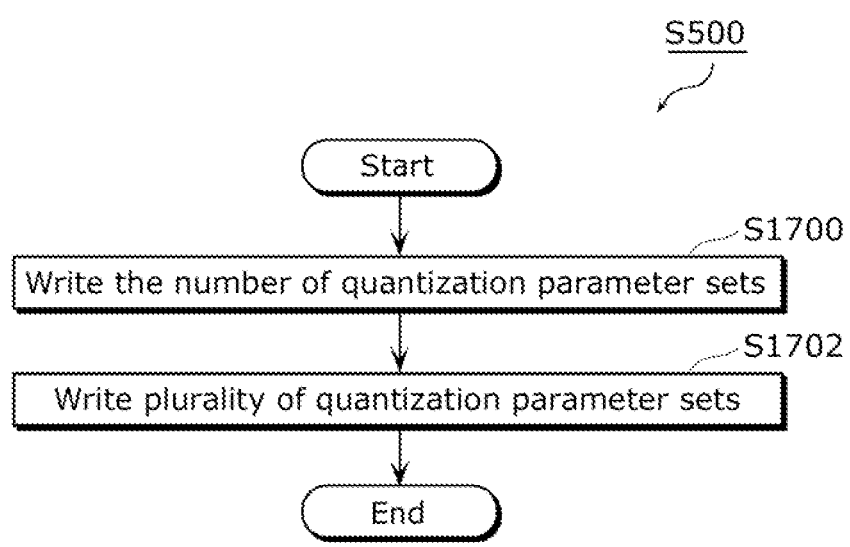
FIG. 17 is a flowchart showing a flow of processing for writing a quantization parameter set into a header of the coded stream in a coding method according to Embodiment 2 of the present invention.

FIG. 17 is a flowchart showing a flow of processing for writing a quantization parameter set into the header of a coded stream in a coding method according to Embodiment 2 of the present invention. Specifically, FIG. 17 shows the details of processing of step S500 in FIG. 5.

First, the set number writing unit 302b writes a value indicating the number of quantization parameter sets into the header of a coded stream (S1700). Specifically, the set number writing unit 302b writes a value indicating the number of quantization parameter sets D1202 into the sequence header D1200 shown in FIG. 12, for example.

Next, the quantization parameter set writing unit 1502c writes, into the header of the coded stream, a plurality of quantization parameter sets, the number of which depends on the value indicating the written number of quantization parameter sets (S1702). Specifically, for example, the quantization parameter set writing unit 1502c writes N quantization parameter sets (first to Nth quantization parameter sets) into the sequence header D1200 shown in FIG. 12, N being indicated by the number of quantization parameter sets D1202.

Figure 18:
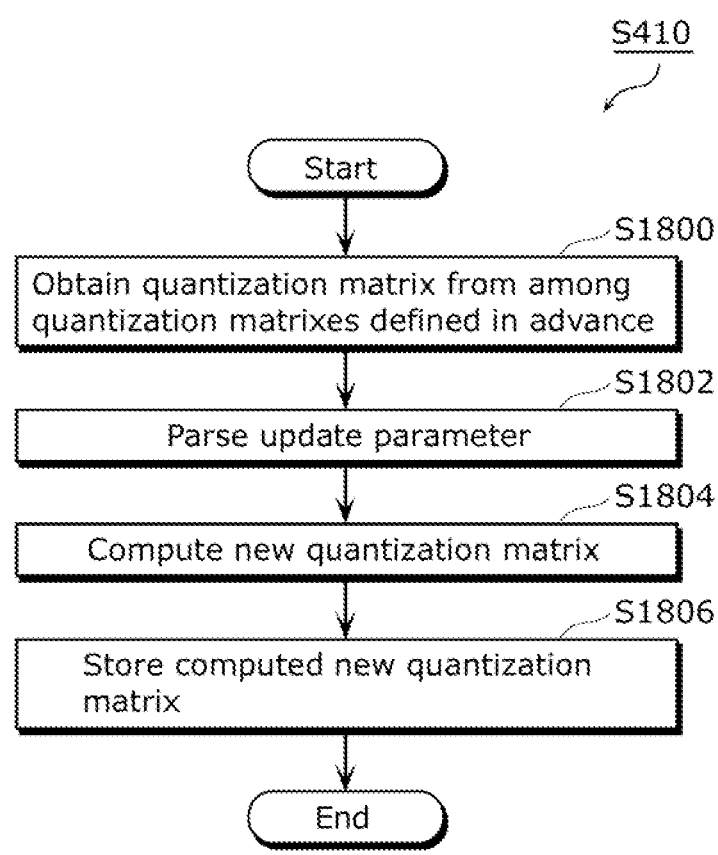
FIG. 18 is a flowchart showing a flow of processing for generating a new quantization matrix in the decoding method according to Embodiment 2 of the present invention.

FIG. 18 is a flowchart showing a flow of processing for generating a new quantization matrix in the decoding method according to Embodiment 2 of the present invention. Specifically, FIG. 18 shows the details of processing of step S410 in FIG. 4.

First, the update unit 1410a obtains a quantization matrix defined in advance (S1800). The quantization matrix defined in advance is a quantization matrix defined in advance in accordance with standards, for example. Further, the quantization matrix defined in advance may be a quantization matrix defined in advance for each level in the hierarchical prediction order in the hierarchical prediction structure shown in FIG. 9.

Next, the update unit 1410a parses an update parameter from the header of the coded picture (S1802). Then, the update unit 1410a computes a new quantization matrix, based on the obtained quantization matrix and the parsed update parameter (S1804). Specifically, the update unit 1410a computes a new quantization matrix by, for example, adding or multiplying a value representing a quantization matrix to or by the value representing the update parameter.

At last, the storing unit 210b stores the computed new quantization matrix into the first memory unit 202d (S1806).

Figure 19:
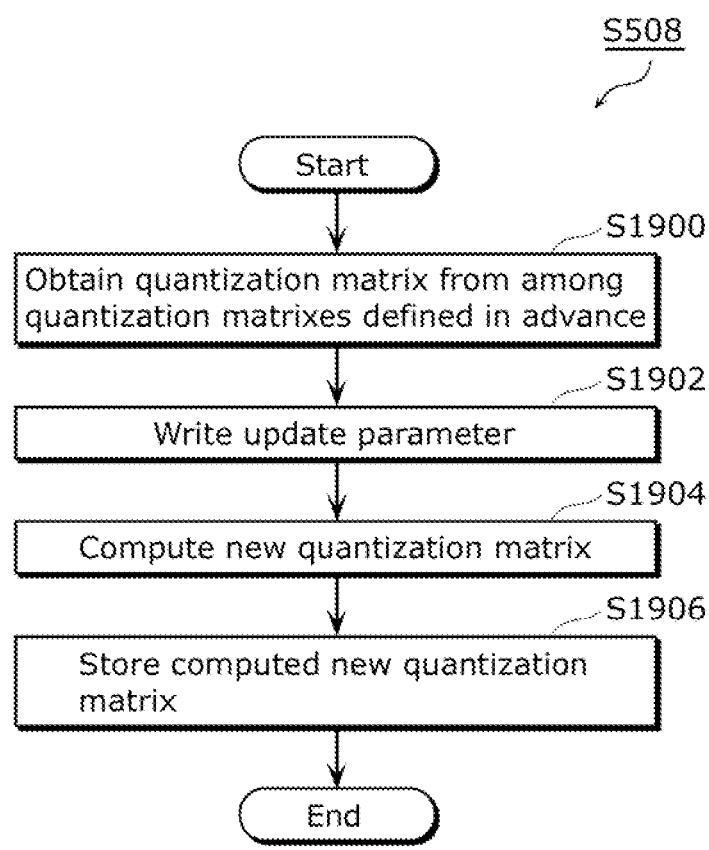
FIG. 19 is a flowchart showing a flow of processing for generating a new quantization matrix in the coding method according to Embodiment 2 of the present invention.

FIG. 19 is a flowchart showing a flow of processing for generating a new quantization matrix in the coding method according to Embodiment 2 of the present invention. Specifically, FIG. 19 shows the details of processing of step S508 in FIG. 5.

First, the computation unit 1508a obtains a quantization matrix defined in advance (S1900). Next, the update parameter writing unit 308c writes an update parameter into the header of a coded picture (S1902).

Then, the computation unit 1508a computes a new quantization matrix, based on the obtained quantization matrix and the written update parameter (S1904). Then, the storing unit 308b stores the computed new quantization matrix into the first memory unit 302d (S1906).

In this way, a new quantization matrix can be computed based on the quantization matrix defined in advance and the update parameter parsed from the header of the coded picture. Specifically, it is sufficient that the update parameter is coded in the header of a coded picture, and thus the coding apparatus 1500 does not need to code the new quantization matrix itself in the header of the coded picture. Therefore, it is possible to suppress an increase in the amount of coding a quantization matrix when pictures are coded using a different quantization matrix for each in order to improve image quality.

Embodiment 3

Next is a description of Embodiment 3 of the present invention. In the present embodiment, a difference from Embodiments 1 and 2 is that a picture header identifier is coded in the header of a coded picture.

Figure 20:
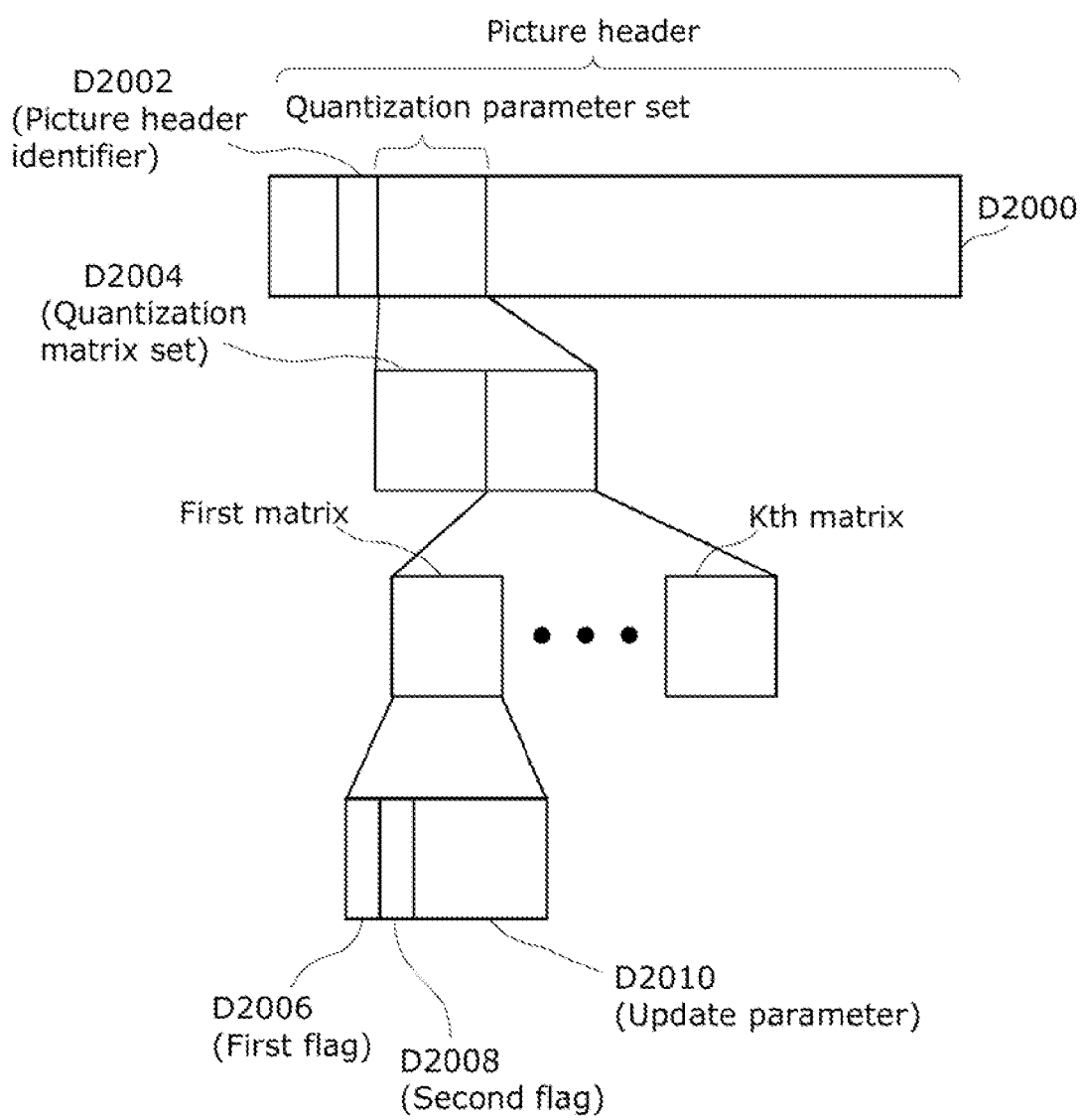
FIG. 20 shows a configuration of a picture header included in a coded stream according to Embodiment 3 of the present invention.

FIG. 20 shows the configuration of a picture header included in a coded stream according to Embodiment 3 of the present invention.

As shown in FIG. 20, a picture header identifier D2002 for identifying one picture header from among a plurality of picture headers is coded in a picture header D2000. Each picture header is associated with a quantization parameter set in the present embodiment.

A quantization parameter set associated with the selected picture header is coded next.

The quantization parameter set coded in the selected picture header includes a quantization matrix set D2004 including a plurality of quantization scaling matrixes or a plurality of quantization offset matrixes.

In each quantization matrix set, a first flag D2006 that indicates whether a new quantization matrix is to be transmitted, and a second flag D2008 that indicates whether a new quantization matrix is to be computed from a quantization matrix defined in advance or a quantization matrix computed previously are present. It should be noted that this second flag does not necessarily need to be present. Even in such a case, a new quantization matrix can be computed from a quantization matrix defined in advance or a quantization matrix computed previously.

Then, when the first flag D2006 indicates that a new quantization matrix is to be transmitted, an update parameter D2010 for updating the quantization matrix defined in advance or the quantization matrix computed previously is coded, following the first flag D2006 and the second flag D2008.

Embodiment 4

The processing described in Embodiment 1 can be simply implemented by an independent computer system, by recording, in a recording medium, a program for implementing the configurations for the coding method and the decoding method described in Embodiment 1. The recording medium may be any recording medium as long as the program can be recorded, such as a magnetic disk, an optical disk, a magnetic optical disk, an IC card, and a semiconductor memory.

Hereinafter, the applications to the coding method and the decoding method described in Embodiment 1 and systems using thereof will be described.

Figure 21:
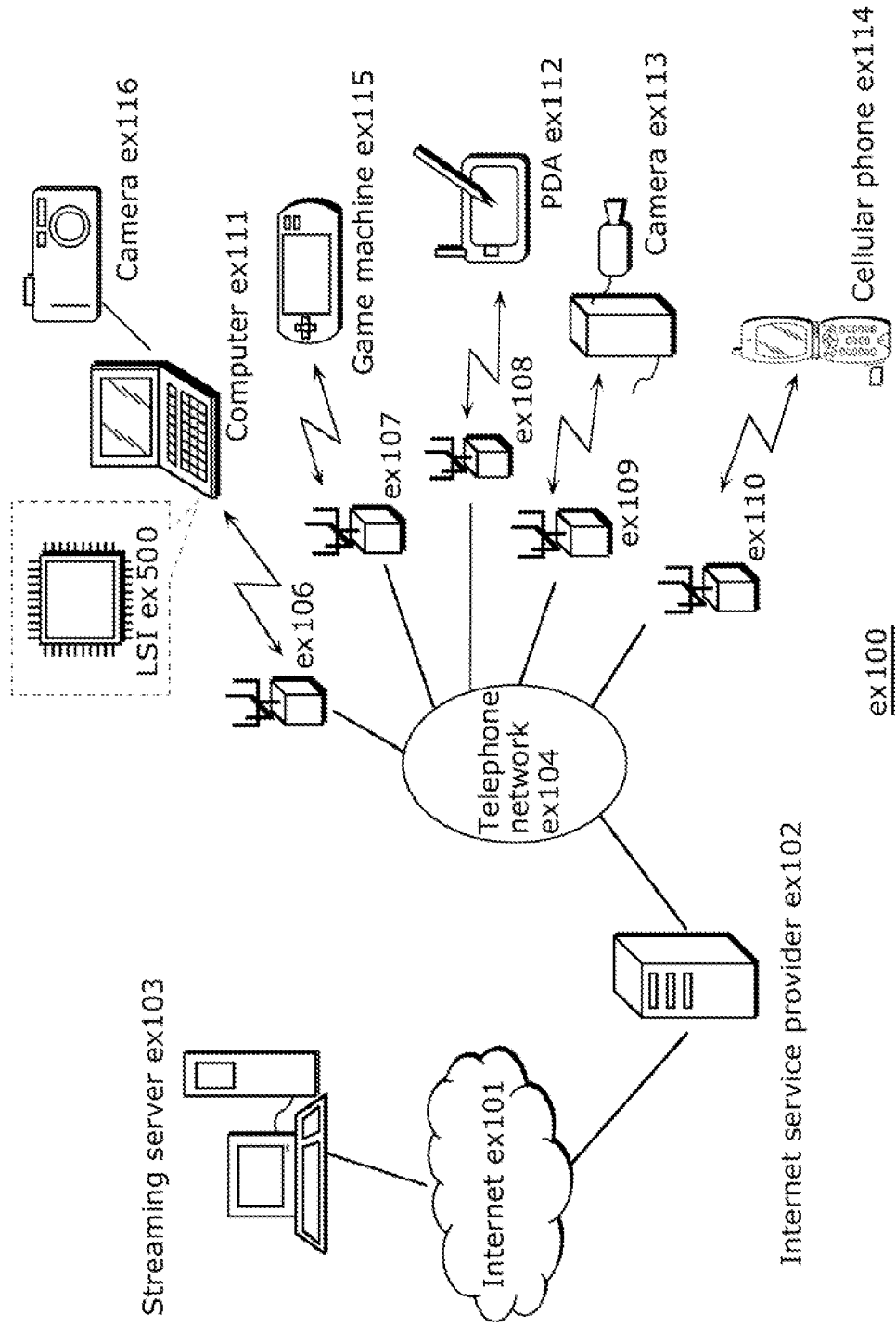
FIG. 21 is a schematic diagram showing an example of an overall configuration of a content providing system for implementing content distribution services.

FIG. 21 illustrates an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via an Internet ex101, an Internet service provider ex102, a telephone network ex104, as well as the base stations ex106 to ex110.

However, the configuration of the content providing system ex100 is not limited to the configuration shown in FIG. 21, and a combination in which any of the elements are connected is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing moving images. A camera ex116, such as a digital video camera, is capable of capturing both still images and moving images. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded as described above in Embodiment 1, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and moving images captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding images may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the moving image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

When each of the devices included in the content providing system ex100 performs coding and decoding, the image coding method and the image decoding method shown in Embodiment 1 may be used.

The cellular phone ex114 will be described as an example of such a device.

Figure 22:
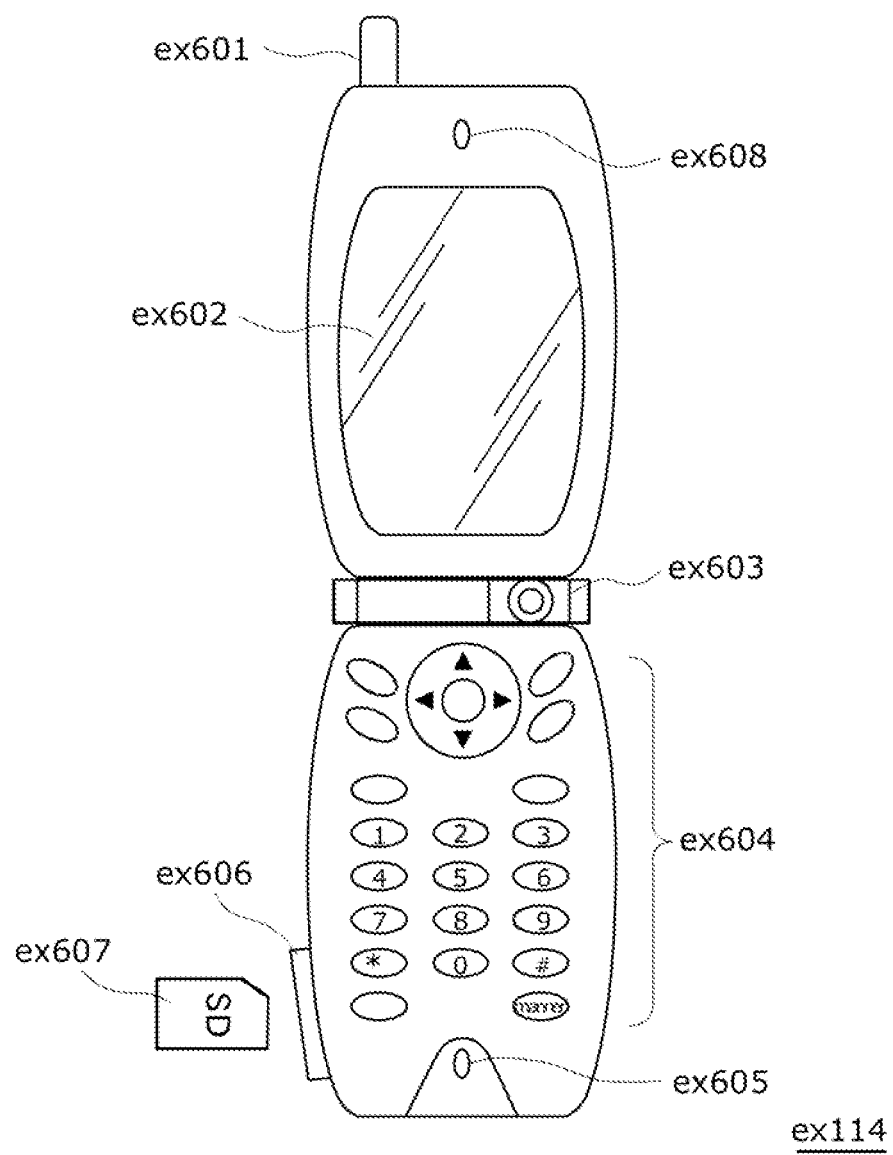
FIG. 22 shows the appearance of a cellular phone.

FIG. 22 illustrates the cellular phone ex114 that uses the image coding method and the image decoding method described in Embodiment 1. The cellular phone ex114 includes: an antenna ex601 for transmitting and receiving radio waves through the base station ex110; a camera unit ex603 such as a CCD camera capable of capturing moving and still images; a display unit ex602 such as a liquid crystal display for displaying the data such as decoded video captured by the camera unit ex603 or received by the antenna ex601; a main body unit including a set of operation keys ex604; an audio output unit ex608 such as a speaker for output of audio; an audio input unit ex605 such as a microphone for input of audio; a recording medium ex607 for recording coded or decoded data including data of captured moving or still images, data of received e-mails, and data of moving or still images; and a slot unit ex606 for enabling the cellular phone ex114 to attach the recording medium ex607. The recording medium ex607 is a medium that stores a flash memory device within a plastic case, for example, an SD Card. The flash memory device is one type of Electrically Erasable and Programmable Read-Only Memory (EEPROM) which is a non-volatile memory that is electrically rewritable and erasable.

Figure 23:
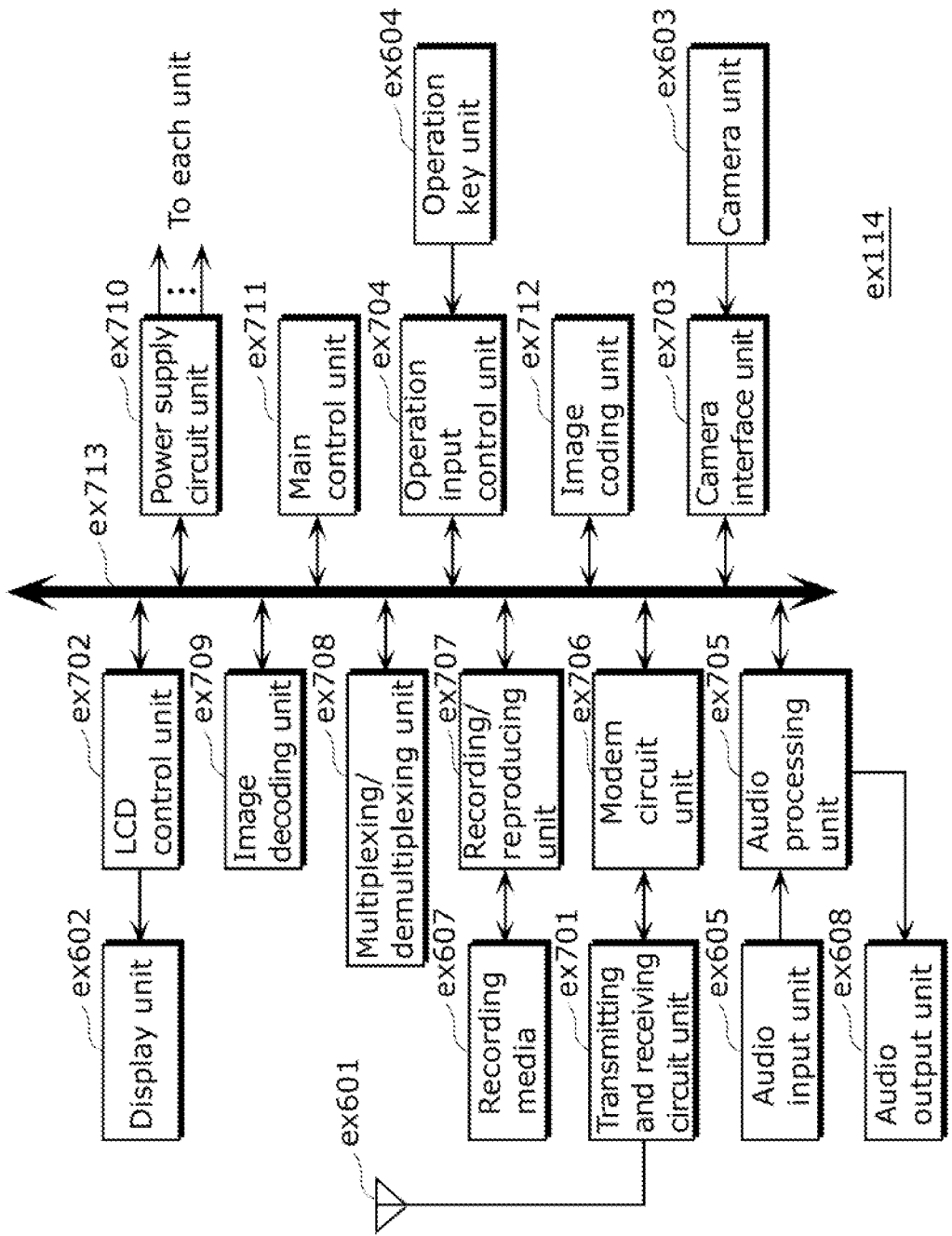
FIG. 23 is a block diagram showing an example of a configuration of the cellular phone.

Next, the cellular phone ex114 will be described with reference to FIG. 23. In the cellular phone ex114, a main control unit ex711 designed to control overall each unit of the main body including the display unit ex602 as well as the operation keys ex604 is connected mutually, via a synchronous bus ex713, to a power supply circuit unit ex710, an operation input control unit ex704, an image coding unit ex712, a camera interface unit ex703, a liquid crystal display (LCD) control unit ex702, an image decoding unit ex709, a multiplexing/demultiplexing unit ex708, a recording/reproducing unit ex707, a modem circuit unit ex706, and an audio processing unit ex705.

When a call-end key or a power key is turned ON by a user's operation, the power supply circuit unit ex710 supplies the respective units with power from a battery pack so as to activate the cell phone ex114 that is digital and is equipped with the camera.

In the cellular phone ex114, the audio processing unit ex705 converts the audio signals collected by the audio input unit ex605 in voice conversation mode into digital audio data under the control of the main control unit ex711 including a CPU, ROM, and RAM. Then, the modem circuit unit ex706 performs spread spectrum processing on the digital audio data, and the transmitting and receiving circuit unit ex701 performs digital-to-analog conversion and frequency conversion on the data, so as to transmit the resulting data via the antenna ex601. In addition, in the cellular phone ex114, the transmitting and receiving circuit unit ex701 amplifies the data received by the antenna ex601 in voice conversation mode and performs frequency conversion and the analog-to-digital conversion on the data. Then, the modem circuit unit ex706 performs inverse spread spectrum processing on the data, and the audio processing unit ex705 converts it into analog audio data, so as to output it via the audio output unit ex608.

Furthermore, when an e-mail in data communication mode is transmitted, text data of the e-mail inputted by operating the operation keys ex604 of the main body is sent out to the main control unit ex711 via the operation input control unit ex704. The main control unit ex711 causes the modem circuit unit ex706 to perform spread spectrum processing on the text data, and the transmitting and receiving circuit unit ex701 performs the digital-to-analog conversion and the frequency conversion on the resulting data to transmit the data to the base station ex110 via the antenna ex601.

When image data is transmitted in data communication mode, the image data captured by the camera unit ex603 is supplied to the image coding unit ex712 via the camera interface unit ex703. When the image data is not transmitted, the image data captured by the camera unit ex603 can be displayed directly on the display unit ex602 via the camera interface unit ex703 and the LCD control unit ex702.

The image coding unit ex712 including the image coding apparatus as described in the present invention compresses and codes the image data supplied from the camera unit ex603 using the coding method employed by the image coding apparatus as shown in Embodiment 1 so as to transform the data into coded image data, and sends the data out to the multiplexing/demultiplexing unit ex708. Furthermore, the cellular phone ex114 simultaneously sends out, as digital audio data, the audio received by the audio input unit ex605 during the capturing with the camera unit ex603 to the multiplexing/demultiplexing unit ex708 via the audio processing unit ex705.

The multiplexing/demultiplexing unit ex708 multiplexes the coded image data supplied from the image coding unit ex712 and the audio data supplied from the audio processing unit ex705, using a predetermined method. Then, the modem circuit unit ex706 performs spread spectrum processing on the multiplexed data obtained by the multiplexing/demultiplexing unit ex708. After the digital-to-analog conversion and frequency conversion on the data, the transmitting and receiving circuit unit ex701 transmits the resulting data via the antenna ex601.

When receiving data of a video file which is linked to a Web page and others in data communication mode, the modem circuit unit ex706 performs inverse spread spectrum processing on the data received from the base station ex110 via the antenna ex601, and sends out the multiplexed data obtained as a result of the inverse spread spectrum processing to the multiplexing/demultiplexing unit ex708.

In order to decode the multiplexed data received via the antenna ex601, the multiplexing/demultiplexing unit ex708 demultiplexes the multiplexed data into a bitstream of image data and that of audio data, and supplies the coded image data to the image decoding unit ex709 and the audio data to the audio processing unit ex705, respectively via the synchronous bus ex713.

Next, the image decoding unit ex709 including the image decoding apparatus as described in the present invention decodes the bitstream of the image data using the decoding method corresponding to the coding method as shown in Embodiment 1 so as to generate reproduced video data, and supplies this data to the display unit ex602 via the LCD control unit ex702. Thus, the video data included in the video file linked to the Web page, for instance, is displayed. Simultaneously, the audio processing unit ex705 converts the audio data into analog audio data, and supplies the data to the audio output unit ex608. Thus, the audio data included in the video file linked to the Web page, for instance, is reproduced.

Figure 24:
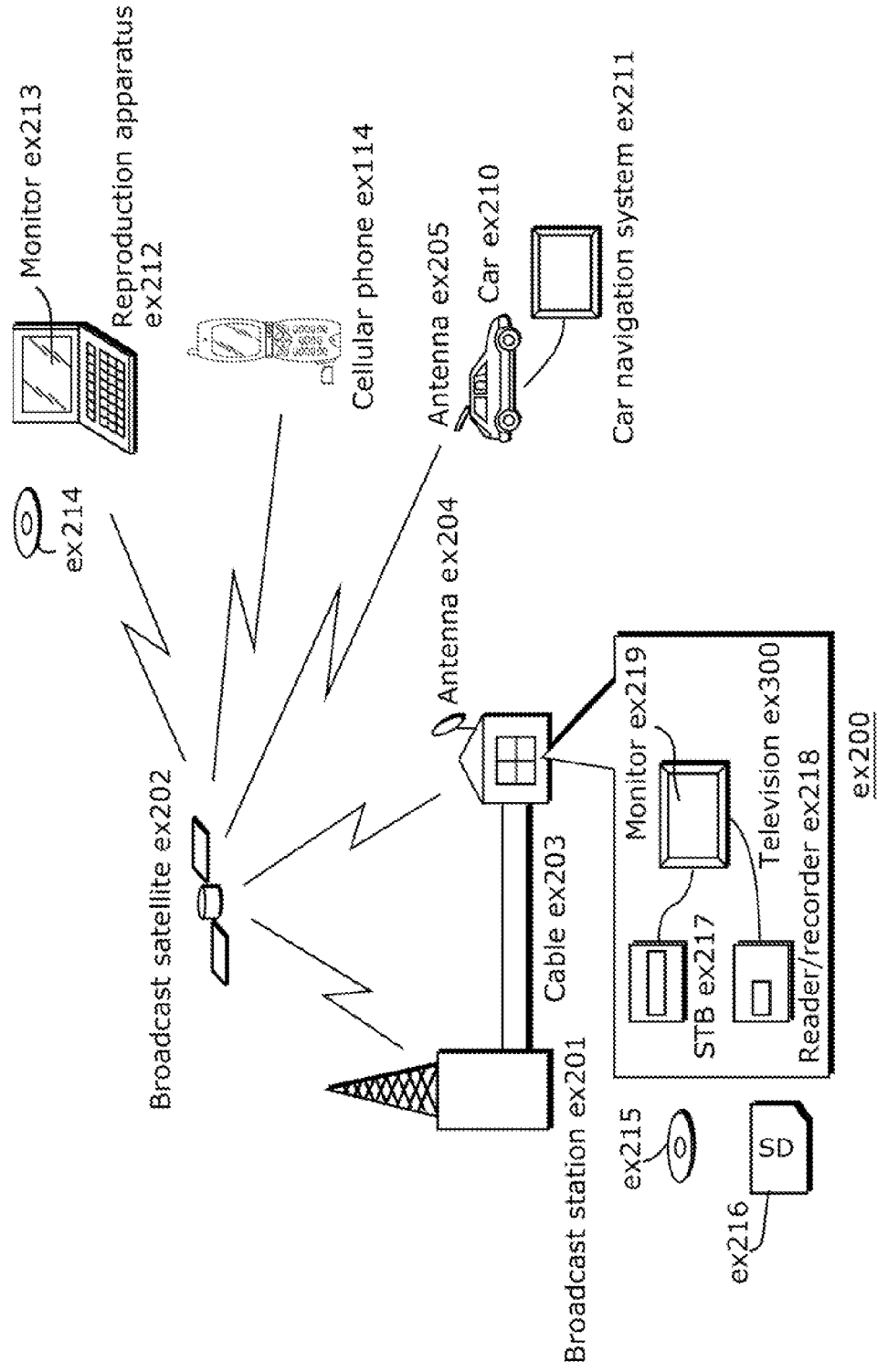
FIG. 24 is a schematic diagram showing an example of an overall configuration of a digital broadcasting system.

The present invention is not limited to the above-mentioned system because terrestrial or satellite digital broadcasting has been in the news lately, and at least either the image coding apparatus or the image decoding apparatus described in Embodiment 1 can be incorporated into a digital broadcasting system as shown in FIG. 24. More specifically, a broadcast station ex201 communicates or transmits, via radio waves to a broadcast satellite ex202, audio data, video data, or a bitstream obtained by multiplexing the audio data and the video data. Upon receipt of the bitstream, the broadcast satellite ex202 transmits radio waves for broadcasting. Then, a home-use antenna ex204 with a satellite broadcast reception function receives the radio waves, and a device, such as a television (receiver) ex300 and a set top box (STB) ex217 decodes a coded bitstream and reproduces the decoded bitstream. Furthermore, a reader/recorder ex218 that reads and decodes such a bitstream obtained by multiplexing image data and audio data that are recorded on recording media ex215 and 216, such as a CD and a DVD may include the image decoding apparatus as shown in Embodiment 1. In this case, the reproduced video signals are displayed on a monitor ex219. It is also possible to implement the image decoding apparatus in the set top box ex217 connected to a cable ex203 for a cable television or an antenna ex204 for satellite and/or terrestrial broadcasting, so as to reproduce the video signals on the monitor ex219 of the television ex300. The image decoding apparatus may be included not in the set top box but in the television ex300. Also, a car ex210 having an antenna ex205 can receive signals from the satellite ex202 or the base station ex201 for reproducing video on a display device such as a car navigation system ex211 set in the car ex210.

Furthermore, the image decoding apparatus or the image coding apparatus as shown in Embodiment 1 can be implemented in the reader/recorder ex218 (i) for reading and decoding the video data, the audio data, or the coded bitstream obtained by multiplexing the video data and the audio data, or (ii) for coding the video data, the audio data, or the coded bitstream obtained by multiplexing the video data and the audio data and recording the resulting data as the multiplexed data on the recording medium ex215. Here, the video data and the audio data are recorded on the recording medium ex215, such as a BD and a DVD. In this case, the reproduced video signals are displayed on the monitor ex219. Furthermore, the reproduced video signals can be reproduced by another device or system, using the recording medium ex215 on which the coded bitstream is recorded. For example, another reproduction apparatus ex212 can reproduce the video signals on a monitor ex213, using a recording medium ex214 on which the coded bitstream is copied.

Furthermore, it is also possible to implement the image decoding apparatus in the set top box ex217 connected to the cable ex203 for a cable television or the antenna ex204 for satellite and/or terrestrial broadcasting, so as to reproduce the video signals on the monitor ex219 of the television ex300. The image decoding apparatus may be included not in the set top box but in the television ex300.

Figure 25:
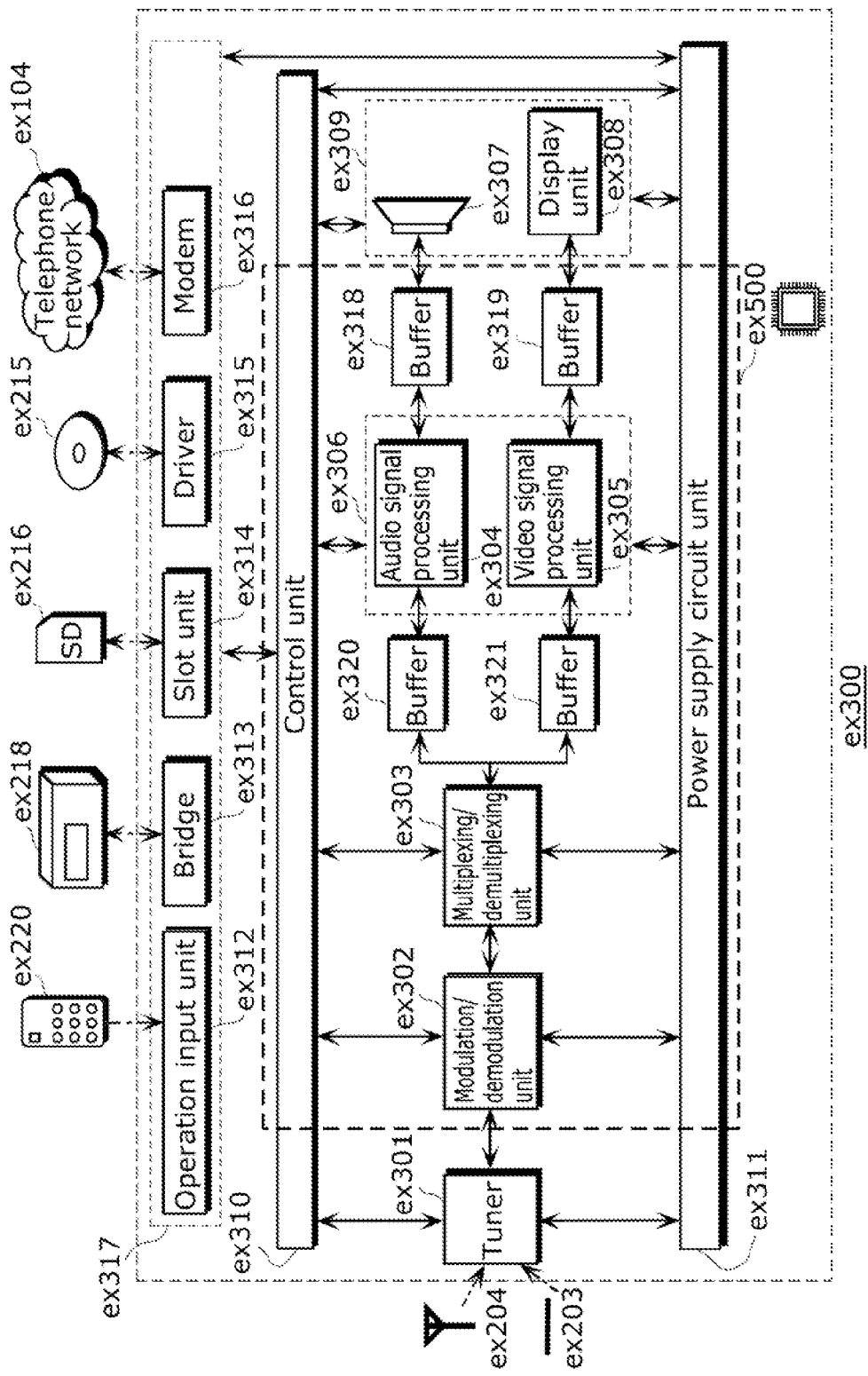
FIG. 25 is a block diagram showing an example of a configuration of a television.

FIG. 25 illustrates the television (receiver) ex300 that uses the image coding method and the image decoding method described in Embodiment 1. The television ex300 includes: a tuner ex301 that obtains or provides a bitstream of video information from and through the antenna ex204 or the cable ex203, etc. that receives a broadcast; a modulation/demodulation unit ex302 that demodulates the received coded data or modulates data into coded data to be supplied outside; and a multiplexing/demultiplexing unit ex303 that demultiplexes the modulated data into video data and audio data, or multiplexes the coded video data and audio data into data. The television ex300 further includes: a signal processing unit ex306 including an audio signal processing unit ex304 and a video signal processing unit ex305 that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, a configuration will be described in which the television ex300 decodes data obtained from outside through the antenna ex204 and others and reproduces the decoded data. In the television ex300, upon receipt of a user operation from a remote controller ex220 and others, the multiplexing/demultiplexing unit ex303 demultiplexes the video data and audio data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in Embodiment 1, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read a coded bitstream not through a broadcast and others but from the recording media ex215 and ex216, such as a magnetic disk, an optical disk, and an SD card. Next, a configuration will be described in which the television ex300 codes an audio signal and a video signal, and transmits the data outside or writes the data on a recording medium. In the television ex300, upon receipt of a user operation from the remote controller ex220 and others, the audio signal processing unit ex304 codes an audio signal, and the video signal processing unit ex305 codes a video signal, under control of the control unit ex310 using the coding method as described in Embodiment 1. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be not capable of coding, multiplexing, and providing outside data but capable of only one of receiving, decoding, and providing outside data.

Furthermore, when the reader/recorder ex218 reads or writes a coded bitstream from or in a recording medium, one of the television ex300 and the reader/recorder ex218 may decode or code the coded bitstream, and the television ex300 and the reader/recorder ex218 may share the decoding or coding.

Figure 26:
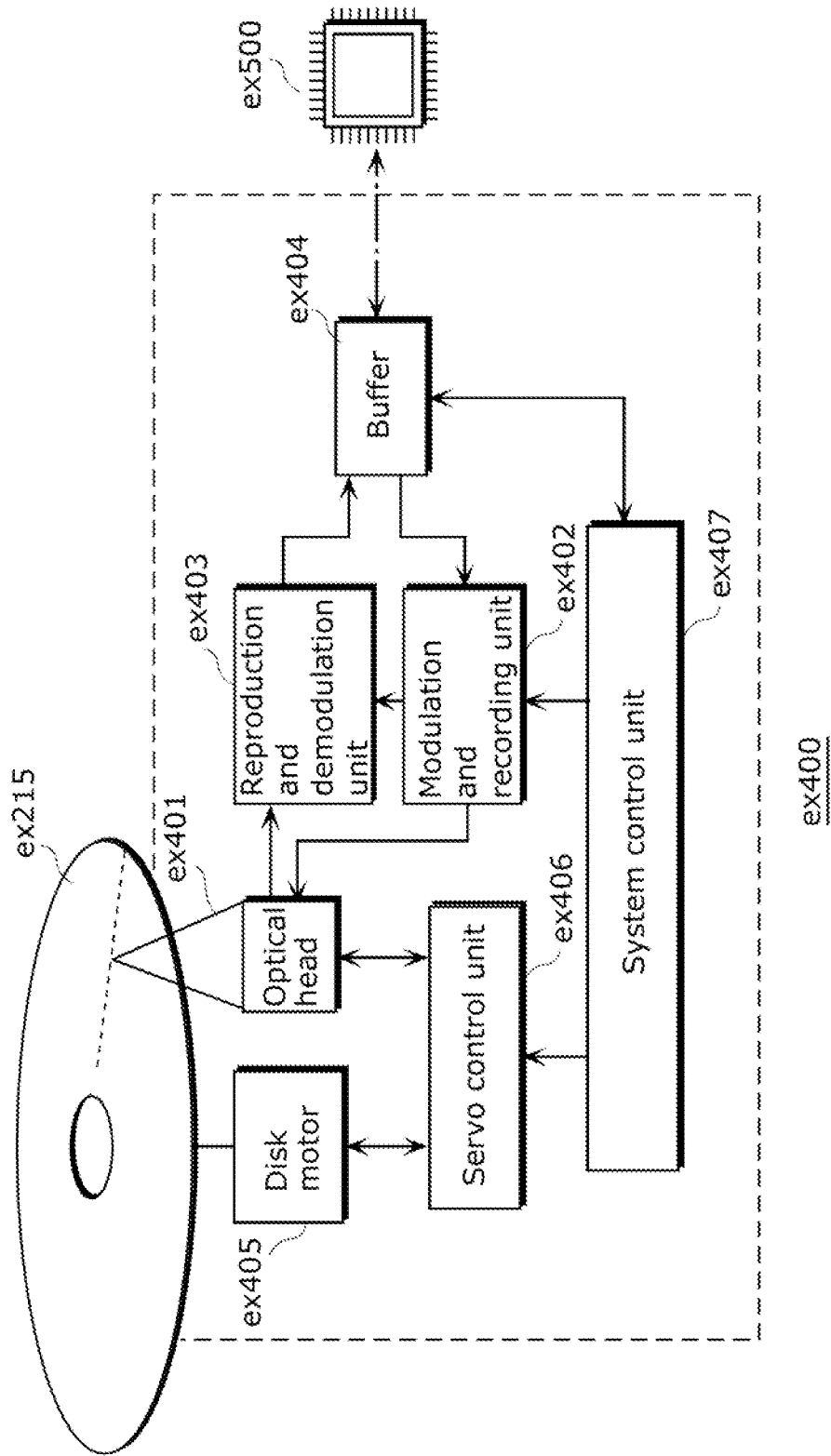
FIG. 26 is a block diagram showing an example of a configuration of an information reproducing/recording unit that reads and writes information from or on a recording medium that is an optical disk.

As an example, FIG. 26 illustrates a configuration of an information reproducing/recording unit ex400 when data is read or written from or in an optical disk. The information reproducing/recording unit ex400 includes constituent elements ex401 to ex407 to be described hereinafter. The optical head ex401 irradiates a laser spot on a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 27:
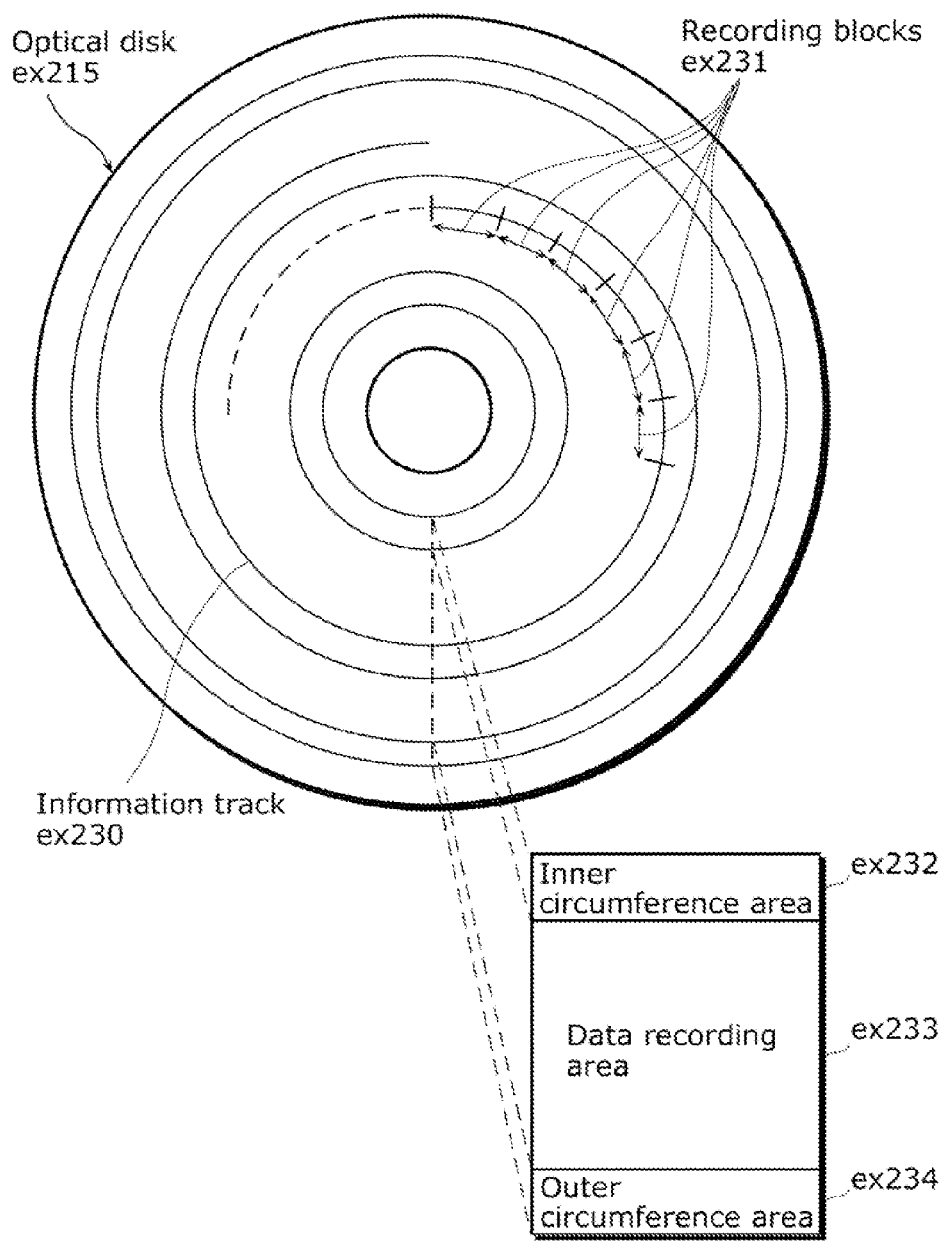
FIG. 27 shows an example of a configuration of the recording medium that is an optical disk.

FIG. 27 schematically illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio data, coded video data, or coded data obtained by multiplexing the coded audio data and the coded video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and recording information having different layers from various angles.

Furthermore, the car ex210 having the antenna ex205 can receive data from the satellite ex202 and others, and reproduce video on the display device such as the car navigation system ex211 set in the car ex210, in a digital broadcasting system ex200. Here, a configuration of the car navigation system ex211 will be a configuration, for example, including a GPS receiving unit from the configuration illustrated in FIG. 25. The same will be true for the configuration of the computer ex111, the cellular phone ex114, and others. Furthermore, similarly to the television ex300, a terminal such as the cellular phone ex114 may have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus.

As such, the image coding method and the image decoding method in Embodiment 1 can be used in any of the devices and systems described. Thus, the advantages described in Embodiment 1 can be obtained.

Furthermore, the present invention is not limited to Embodiments, and various modifications and revisions are possible without departing from the scope of the present invention.

Embodiment 5

Figure 28:
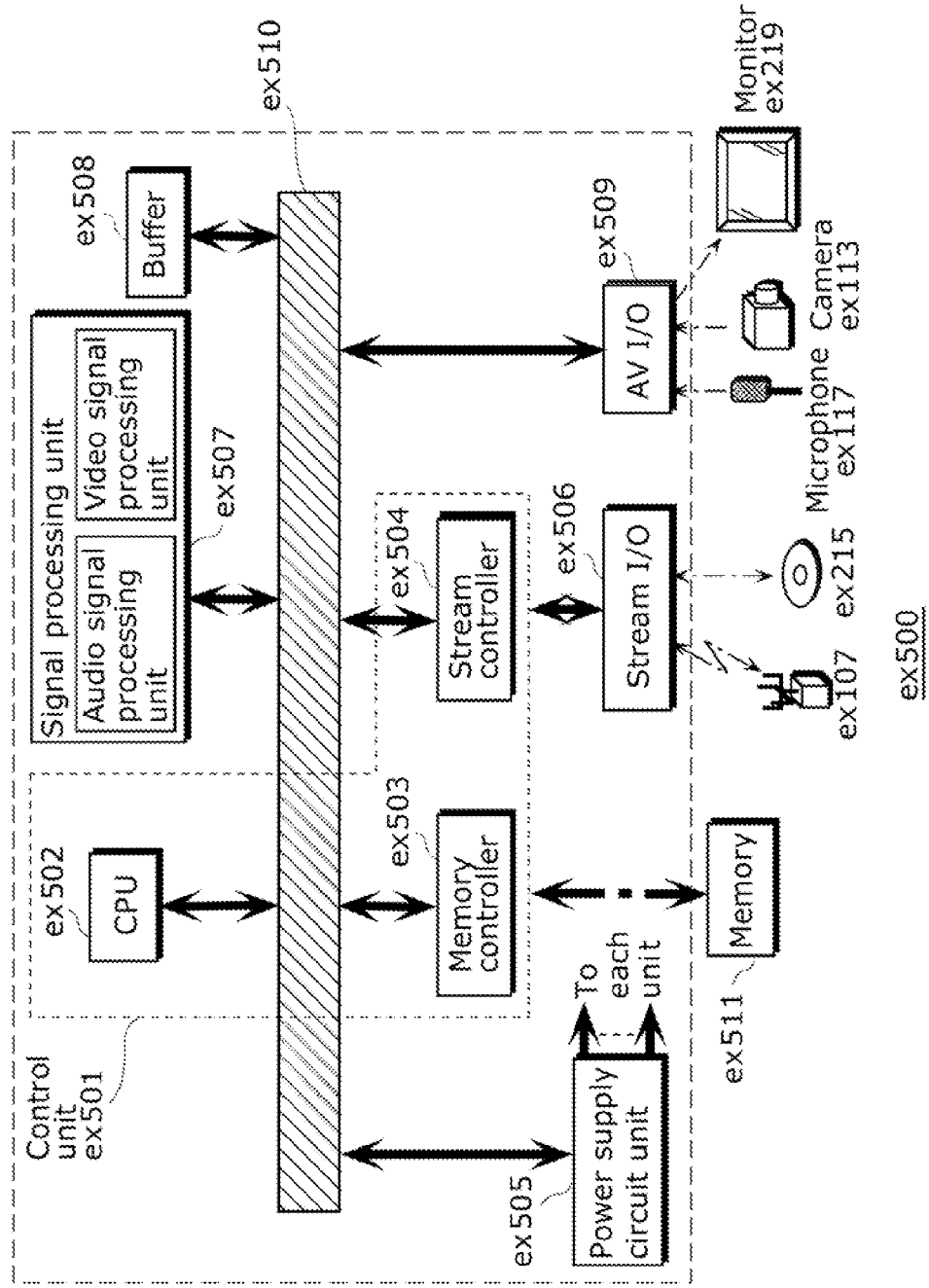
FIG. 28 is a block diagram showing an example of a configuration of an integrated circuit for implementing the image coding method and the image decoding method according to the embodiments.

Each of the image coding method, the image coding apparatus, the image decoding method, and the image decoding apparatus in each of Embodiments is typically achieved in the form of an integrated circuit or a Large Scale Integrated (LSI) circuit. As an example of the LSI, FIG. 28 illustrates a configuration of the LSI ex500 that is made into one chip. The LSI ex500 includes elements ex501 to ex509 to be described below, and the elements are connected to each other through a bus ex510. The power supply circuit unit ex505 is activated by supplying each of the elements with power when power is on.

For example, when coding is performed, the LSI ex500 receives an AV signal from a microphone ex117, a camera ex113, and others through an AV I/O ex509 under control of a control unit ex501 including a CPU ex502, a memory controller ex503, and a stream controller ex504. The received AV signal is temporarily stored in a memory ex511 outside the LSI ex500, such as an SDRAM. Under control of the control unit ex501, the stored data is subdivided into data portions according to the processing amount and speed as necessary. Then, the data portions are transmitted to a signal processing unit ex507. The signal processing unit ex507 codes an audio signal and/or a video signal. Here, the coding of the video signal is the coding described in Embodiments. Furthermore, the signal processing unit ex507 sometimes multiplexes the coded audio data and the coded video data, and a stream I/O ex506 provides the multiplexed data outside. The provided bitstream is transmitted to a base station ex107, or written on the recording medium ex215. When data sets are multiplexed, the data sets should be temporarily stored in the buffer ex508 so that the data sets are synchronized with each other.

For example, when coded data is decoded, the LSI ex500 temporarily stores, in the memory ex511, the coded data obtained from the base station ex107 through the stream I/O ex506 or read from the recording medium ex215 under control of the control unit ex501. Under control of the control unit ex501, the stored data is subdivided into data portions according to the processing amount and speed as necessary. Then, the data portions are transmitted to the signal processing unit ex507. The signal processing unit ex507 decodes audio data and/or video data. Here, the decoding of the video signal is the decoding described in Embodiments. Furthermore, a decoded audio signal and a decoded video signal may be temporarily stored in the buffer ex508 and others so that the signals can be reproduced in synchronization with each other. Each of the output units, such as the cellular phone ex114, the game machine ex115, and the television ex300 provides the decoded output signal through, for example, the memory 511 as necessary.

Although the memory ex511 is an element outside the LSI ex500 in the description, it may be included in the LSI ex500. The buffer ex508 is not limited to one buffer, but may be composed of buffers. Furthermore, the LSI ex500 may be made into one chip or a plurality of chips.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. A Field Programmable Gate Array (FPGA) that is programmable after manufacturing an LSI or a reconfigurable processor allowing reconfiguration of the connection or configuration of an LSI can be used for the same purpose.

In the future, with advancement in semiconductor technology, a brand-new technology may replace LSI. The functional blocks can be integrated using such a technology. One such possibility is that the present invention is applied to biotechnology.

Although the above is a description of the coding method, the coding apparatus, the decoding method, and the decoding apparatus according to the present invention based on the embodiments, the present invention is not limited to those embodiments. The scope of the present invention includes various modifications to the embodiments that may be conceived by those skilled in the art, and other embodiments constructed by combining constituent elements and steps in different embodiments, which do not depart from the essence of the present invention.

INDUSTRIAL APPLICABILITY

The decoding method and the coding method according to the present invention can be utilized for televisions, digital video recorders, car navigation systems, cellular phones, digital cameras, and digital video cameras, for example.

REFERENCE SIGNS LIST 200, 1400 Decoding apparatus
202 Obtaining unit
202a, 1402a Set number parsing unit
202b, 1402b, 208 Quantization parameter set parsing unit
202c, 302a Duplication unit
202d, 302d First memory unit
204 Identifier parsing unit
206, 304 Selection unit
210, 308 Generation unit
210a, 1410a Update unit
210b, 308b Storing unit
212 Decoding unit
212a, 310d Inverse quantization unit
212b, 310e Inverse transform unit
212c Sample reconstruction unit
212d, 310g Second memory unit
212e, 310f Sample prediction unit
300, 1500 Coding apparatus
302 Stream header writing unit
302b Set number writing unit
302c, 1502c Quantization parameter set writing unit
306 Identifier writing unit
308a, 1508a Computation unit
308c Update parameter writing unit
310 Coding Unit
310a Subtraction unit
310b Transform unit
310c Quantization unit
310h Adding unit
ex100 Content providing system
ex101 Internet
ex102 Internet service provider
ex103 Streaming server
ex104 Telephone network
ex106, ex107, ex108, ex109, ex110 Base station
ex111 Computer
ex112 PDA
ex113, ex116 Camera
ex114 Digital cellular phone with camera (cellular phone)
ex115 Game machine
ex117 Microphone
ex200 Digital broadcasting system
ex201 Broadcast station
ex202 Broadcast satellite (satellite)
ex203 Cable
ex204, ex205, ex601 Antenna
ex210 Car
ex211 Car navigation system (car navigation)
ex212 Reproduction apparatus
ex213, ex219 Monitor
ex214, ex215, ex216, ex607 Recording medium
ex217 Set top box (STB)
ex218 Reader/Recorder
ex220 Remote controller
ex230 Information track
ex231 Recording block
ex232 Inner circumference area
ex233 Data recording area
ex234 Outer circumference area
ex300 Television
ex301 Tuner
ex302 Modulation/demodulation unit
ex303 Multiplexing/demultiplexing unit
ex304 Audio signal processing unit
ex305 Video signal processing unit
ex306, ex507 Signal processing unit
ex307 Speaker
ex308, ex602 Display unit
ex309 Output unit
ex310, ex501 Control unit
ex311, ex505, ex710 Power supply circuit unit
ex312 Operation input unit
ex313 Bridge
ex314, ex606 Slot unit
ex315 Driver
ex316 Modem
ex317 Interface unit
ex318, ex319, ex320, ex321, ex404, ex508 Buffer
ex400 Information reproducing/recording unit
ex401 Optical head
ex402 Modulation recording unit
ex403 Reproduction demodulating unit
ex405 Disk motor
ex406 Servo control section
ex407 System control unit
ex500 LSI
ex502 CPU
ex503 Memory controller
ex504 Stream controller
ex506 Stream I/O
ex509 AV I/O
ex510 Bus
ex603 Camera unit
ex604 Operation key
ex605 Audio input unit
ex608 Audio output unit
ex701 Transmitting and receiving circuit unit
ex702 LCD control unit
ex703 Camera interface unit (camera I/F unit)
ex704 Operation input control unit
ex705 Audio processing unit
ex706 Modem circuit unit
ex707 Recording/reproducing unit
ex708 Multiplexing/demultiplexing unit
ex709 Image decoding unit
ex711 Main control unit
ex712 Image coding unit
ex713 Synchronous bus

The invention claimed is:

1. A decoding method for decoding a coded picture included in a coded stream, comprising:
obtaining, from a header of the coded stream, a plurality of quantization parameter sets each including a quantization scaling matrix and a quantization offset matrix;
parsing an identifier for identifying a quantization parameter set from a header of the coded picture included in the coded stream;
selecting at least one quantization parameter set from among the plurality of quantization parameter sets, based on the parsed identifier;
parsing a first flag from the header of the coded picture, and determining whether the parsed first flag has a predetermined value;
parsing a second flag from the header of the coded picture, and determining whether the parsed second flag has the predetermined value;
generating a new quantization scaling matrix from another quantization scaling matrix and a first update parameter when the first flag has the predetermined value, the first update parameter being a parameter indicating an amount of change from the another quantization scaling matrix;

generating a new quantization offset matrix from another quantization offset matrix and a second update parameter when the second flag has the predetermined value, the second update parameter being a parameter indicating an amount of change from the another quantization offset matrix; and decoding the coded picture by inversely quantizing the coded picture using (i-i) the generated new quantization scaling matrix when the first flag has the predetermined value and (i-ii) a quantization scaling matrix included in the selected quantization parameter set when the first flag does not have the predetermined value, and using (ii-i) the generated new quantization offset matrix when the second flag has the predetermined value and (ii-ii) a quantization offset matrix included in the selected quantization parameter set when the second flag does not have the predetermined value, wherein in said generating the new quantization scaling matrix, the new quantization scaling matrix is generated by (i) obtaining a quantization scaling matrix previously decoded and included in the coded stream, (ii) parsing the first update parameter from the header of the coded picture, and (iii) adding the first update parameter to the quantization scaling matrix previously decoded and included in the coded stream, and in said generating the new quantization offset matrix, the new quantization offset matrix is generated by (i) obtaining a quantization offset matrix previously decoded and included in the coded stream, (ii) parsing the second update parameter from the header of the coded picture, and (iii) adding the second update parameter to the quantization offset matrix previously decoded and included in the coded stream.

2. The decoding method according to claim 1,
wherein in said obtaining the plurality of quantization parameter sets, the plurality of quantization parameter sets are obtained by (i) parsing a value indicating a number of quantization parameter sets from the header of the coded stream, (ii) parsing a quantization parameter set from the header of the coded stream, and (iii) duplicating content of the parsed quantization parameter set into a plurality of quantization parameter sets, the number of which depends on the number of quantization parameter sets indicated by the parsed value.

3. The decoding method according to claim 2,
wherein the coded stream includes a plurality of the coded pictures coded in accordance with a hierarchical prediction order in a hierarchical prediction structure, and
in said obtaining the plurality of quantization parameter sets, the plurality of quantization parameter sets are obtained by duplicating the content of the parsed quantization parameter set, based on the hierarchical prediction order.

4. The decoding method according to claim 3,
wherein in said obtaining the plurality of quantization parameter sets, the plurality of quantization parameter sets are obtained by duplicating the content of the parsed quantization parameter set into a quantization parameter set for decoding a coded picture at a lower level in the hierarchical prediction order than a level of a coded picture to be decoded using the parsed quantization parameter set.

5. The decoding method according to claim 3,
wherein in said obtaining the plurality of quantization parameter sets, the plurality of quantization parameter sets are obtained by duplicating the content of the parsed quantization parameter set into a quantization parameter set for decoding a coded picture at a same level in the hierarchical prediction order as a level of a coded picture to be decoded using the parsed quantization parameter set.

6. The decoding method according to claim 1,
wherein in said obtaining the plurality of quantization parameter sets, the plurality of quantization parameter sets are obtained by (i) parsing a value indicating a number of quantization parameter sets from the header of the coded stream, and (ii) parsing, from the header of the coded stream, quantization parameter sets, the number of which depends on the parsed value indicating the number of quantization parameter sets.

7. The decoding method according to claim 1,
wherein the quantization scaling matrix controls scaling in inversely quantizing the coded picture, and the quantization offset matrix controls offset in inversely quantizing the coded picture.

8. A coding method for coding a picture to generate a coded stream, comprising:
writing a plurality of quantization parameter sets each including a quantization scaling matrix and a quantization offset matrix into a header of the coded stream;
selecting at least one quantization parameter set from among the plurality of written quantization parameter sets;
writing an identifier for identifying the selected quantization parameter set into a header of a target picture;
determining whether a new quantization scaling matrix is to be used when the target picture is quantized;
determining whether a new quantization offset matrix is to be used when the target picture is quantized;
generating a new quantization scaling matrix from another quantization scaling matrix and a first update parameter when it is determined that a new quantization scaling matrix is to be used, the first update parameter being a parameter indicating an amount of change from the another quantization scaling matrix;
generating a new quantization offset matrix from another quantization offset matrix and a second update parameter when it is determined that a new quantization offset matrix is to be used, the second update parameter being a parameter indicating an amount of change from the another quantization offset matrix; and
coding the target picture by quantizing the target picture using (i-i) the generated new quantization scaling matrix when it is determined that a new quantization scaling matrix is to be used and (i-ii) a quantization scaling matrix included in the selected quantization parameter set when a new quantization scaling matrix is not to be used, and using (ii-i) the generated new quantization offset matrix when it is determined that a new quantization offset matrix is to be used and (ii-ii) a quantization offset matrix included in the selected quantization parameter set when a new quantization offset matrix is not to be used,
wherein in said generating the new quantization scaling matrix, the new quantization scaling matrix is generated by (i) obtaining a quantization scaling matrix coded before being included in the coded stream, (ii) writing the first update parameter into the header of the target picture, and (iii) adding the first update parameter to the quantization scaling matrix coded before being included in the coded stream, and in said generating the new quantization offset matrix, the new quantization offset matrix is generated by (i) obtaining a quantization offset matrix coded before being included in the coded stream, (ii) writing the second update parameter into the header of the target picture, and (iii) adding the second update parameter to the quantization offset matrix coded before being included in the coded stream.

9. The coding method according to claim 8,
wherein in said writing said plurality of quantization parameter sets, the plurality of quantization parameter sets are written into the header of the coded stream by (i) writing, into the header of the coded stream, a value indicating a number of duplicates of a quantization parameter set to be made, and (ii) writing, into the header of the coded stream, the quantization parameter set to be used for duplication.

10. The coding method according to claim 8,
wherein said writing said plurality of quantization parameter sets includes:
writing a value indicating a number of quantization parameter sets into the header of the coded stream; and
writing the plurality of quantization parameter sets into the header of the coded stream, the number of the plurality of quantization parameter sets depending on the written value indicating the number of quantization parameter sets.

11. The coding method according to claim 8, further comprising:
determining a hierarchical prediction structure for a plurality of pictures to be coded;
determining a hierarchical prediction order of the plurality of pictures, based on the determined hierarchical prediction structure; and
setting a plurality of identifiers for identifying respective quantization parameter sets, based on the determined hierarchical prediction order,
wherein in said writing said identifier, among the plurality of set identifiers, an identifier for identifying the selected quantization parameter set is written into the header of the target picture.

12. The coding method according to claim 8,
wherein the quantization scaling matrix controls scaling in quantizing the target picture, and the quantization offset matrix controls offset in quantizing the target picture.

13. A decoding apparatus which decodes a coded picture included in a coded stream, comprising:
an obtaining unit configured to obtain, from a header of the coded stream, a plurality of quantization parameter sets each including a quantization scaling matrix and a quantization offset matrix;
an identifier parsing unit configured to parse an identifier for identifying a quantization parameter set from a header of the coded picture included in the coded stream;
a selection unit configured to select at least one quantization parameter set from among the plurality of quantization parameter sets, based on the parsed identifier;
a parsing unit configured to parse (i) a first flag from the header of the coded picture, and determine whether the parsed first flag has a predetermined value, and (ii) a second flag from the header of the coded picture, and determining whether the parsed second flag has the predetermined value;

a generation unit configured to generate (i) a new quantization scaling matrix from another quantization scaling matrix and a first update parameter when the first flag has the predetermined value and (ii) a new quantization offset matrix from another quantization offset matrix and a second update parameter when the second flag has the predetermined value, the first update parameter being a parameter indicating an amount of change from the another quantization scaling matrix, the second update parameter being a parameter indicating an amount of change from the another quantization offset matrix; and a decoding unit configured to decode the coded picture by inversely quantizing the coded picture using (i-i) the generated new quantization scaling matrix when the first flag has the predetermined value and (i-ii) a quantization scaling matrix included in the selected quantization parameter set when the first flag does not have the predetermined value, and using (ii-i) the generated new quantization offset matrix when the second flag has the predetermined value and (ii-ii) a quantization offset matrix included in the selected quantization parameter set when the second flag does not have the predetermined value, wherein the generation unit is configured to generate the new quantization scaling matrix by (i) obtaining a quantization scaling matrix previously decoded and included in the coded stream, (ii) parsing the first update parameter from the header of the coded picture, and (iii) adding the first update parameter to the quantization scaling matrix previously decoded and included in the coded stream, and to generate the new quantization offset matrix by (i) obtaining a quantization offset matrix previously decoded and included in the coded stream, (ii) parsing the second update parameter from the header of the coded picture, and (iii) adding the second update parameter to the quantization offset matrix previously decoded and included in the coded stream.

14. The decoding apparatus according to claim 13,
wherein said decoding apparatus is configured as an integrated circuit.

15. The decoding apparatus according to claim 13,
wherein the quantization scaling matrix controls scaling in inversely quantizing the coded picture, and the quantization offset matrix controls offset in inversely quantizing the coded picture.

16. A coding apparatus which codes a picture to generate a coded stream, comprising:
a writing unit configured to write a plurality of quantization parameter sets each including a quantization scaling matrix and a quantization offset matrix into a header of the coded stream;
a selection unit configured to select at least one quantization parameter set from among the plurality of written quantization parameter sets;
an identifier writing unit configured to write an identifier for identifying the selected quantization parameter set into a header of a target picture;
a generation unit configured to determine whether a new quantization scaling matrix is to be used when the target picture is quantized and whether a new quantization offset matrix is to be used when the target picture is quantized, and generate a new quantization scaling matrix from another quantization scaling matrix and a first update parameter when determining that a new quantization scaling matrix is to be used and a new quantization offset matrix from another quantization offset matrix and a second update parameter when it is determined that a new quantization offset matrix is to be used, the first update parameter being a parameter indicating an amount of change from the another quantization scaling matrix, and the second update parameter being a parameter indicating an amount of change from the another quantization offset matrix; and a coding unit configured to code the target picture by quantizing the target picture using (i-i) the generated new quantization scaling matrix when it is determined that a new quantization scaling matrix is to be used and (i-ii) a quantization scaling matrix included in the selected quantization parameter set when a new quantization scaling matrix is not to be used, and using (ii-i) the generated new quantization offset matrix when it is determined that a new quantization offset matrix is to be used and (ii-ii) a quantization offset matrix included in the selected quantization parameter set when a new quantization offset matrix is not to be used, wherein the generation unit is configured to generate the new quantization scaling matrix by (i) obtaining a quantization scaling matrix coded before being included in the coded stream, (ii) writing the first update parameter into the header of the target picture, and (iii) adding the first update parameter to the quantization scaling matrix coded before being included in the coded stream, and to generate the new quantization offset matrix by (i) obtaining a quantization offset matrix coded before being included in the coded stream, (ii) writing the second update parameter into the header of the target picture, and (iii) adding the second update parameter to the quantization offset matrix coded before being included in the coded stream.

17. The coding apparatus according to claim 16,
wherein said coding apparatus is configured as an integrated circuit.

18. The coding apparatus according to claim 16,
wherein the quantization scaling matrix controls scaling in quantizing the target picture, and the quantization offset matrix controls offset in quantizing the target picture.

19. A non-transitory computer-readable recording medium having recorded thereon a program for causing a computer to execute the decoding method according to claim 1.

20. A non-transitory computer-readable recording medium having recorded thereon a program for causing a computer to execute the coding method according to claim 8.

* * * * *